US 10,857,876 B2

(12) United States Patent
Myers et al.

(10) Patent No.: US 10,857,876 B2
(45) Date of Patent: Dec. 8, 2020

(54) FILLER INLET WITH FLUID SEPARATION

(71) Applicant: Ford Global Technologies, LLC, Dearborn, MI (US)

(72) Inventors: Eric Myers, Howell, MI (US); Mahfooz-Ul-Haq Mian, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 315 days.

(21) Appl. No.: 15/903,672

(22) Filed: Feb. 23, 2018

(65) Prior Publication Data

US 2019/0263259 A1 Aug. 29, 2019

(51) Int. Cl.
*B60K 15/04* (2006.01)
*F15D 1/00* (2006.01)

(52) U.S. Cl.
CPC ............ *B60K 15/04* (2013.01); *F15D 1/0005* (2013.01); *F15D 1/0015* (2013.01); *B60K 2015/0458* (2013.01); *B60K 2015/0477* (2013.01)

(58) Field of Classification Search
CPC ............ B60K 15/04; B60K 2015/0458; B60K 2015/0477; F15D 1/0015; F15D 1/0005
See application file for complete search history.

(56) References Cited

U.S. PATENT DOCUMENTS

| | | | |
|---|---|---|---|
| 4,222,751 A * | 9/1980 | Shunta | B01D 19/0052 96/172 |
| 4,298,040 A | 11/1981 | Pohan | |
| 4,450,880 A | 5/1984 | Scheurenbrand | |
| 5,740,842 A * | 4/1998 | Maier | B60K 15/03519 137/588 |
| 5,860,460 A * | 1/1999 | Hidano | B60K 15/04 141/286 |
| 5,865,217 A | 2/1999 | Giacomelli et al. | |
| 5,884,809 A * | 3/1999 | Wood | B67D 7/763 222/318 |
| 5,960,833 A | 10/1999 | Der Manuelian | |
| 6,289,945 B1 | 9/2001 | Haboush, II | |
| 6,405,767 B1 | 6/2002 | Marsala et al. | |
| 6,440,317 B1 * | 8/2002 | Koethe | B01D 17/0217 210/774 |
| 7,360,565 B2 | 4/2008 | Peterson et al. | |
| 7,617,851 B2 | 11/2009 | Barnes et al. | |
| 7,870,848 B2 * | 1/2011 | Elwart | F02M 33/02 123/518 |
| 7,997,307 B2 | 8/2011 | Benjey | |
| 8,347,914 B2 | 1/2013 | Runarvot et al. | |

(Continued)

FOREIGN PATENT DOCUMENTS

| CA | 2597275 A1 | 2/2006 |
|---|---|---|
| DE | 2360655 A1 | 6/1975 |

*Primary Examiner* — Nicolas A Arnett
(74) *Attorney, Agent, or Firm* — Geoffrey Brumbaugh; McCoy Russell LLP

(57) ABSTRACT

Methods and systems are provided for a filler inlet of a fuel fill line of a motorized vehicle. In one example, a filler inlet includes a fuel/air separation chamber extending at an angle relative to an opening of the filler inlet, with the opening adapted to receive a fuel nozzle. Fuel may be guided from the fuel nozzle toward a curved wall of the fuel/air separation chamber by a flow guide, and the fuel may separate from entrained air within the fuel/air separation chamber.

6 Claims, 14 Drawing Sheets

(56) References Cited

U.S. PATENT DOCUMENTS

2009/0218009 A1* 9/2009 Rongstock ............. B60K 15/04
141/391
2016/0325619 A1* 11/2016 Le Mat .................. B01D 45/10

* cited by examiner

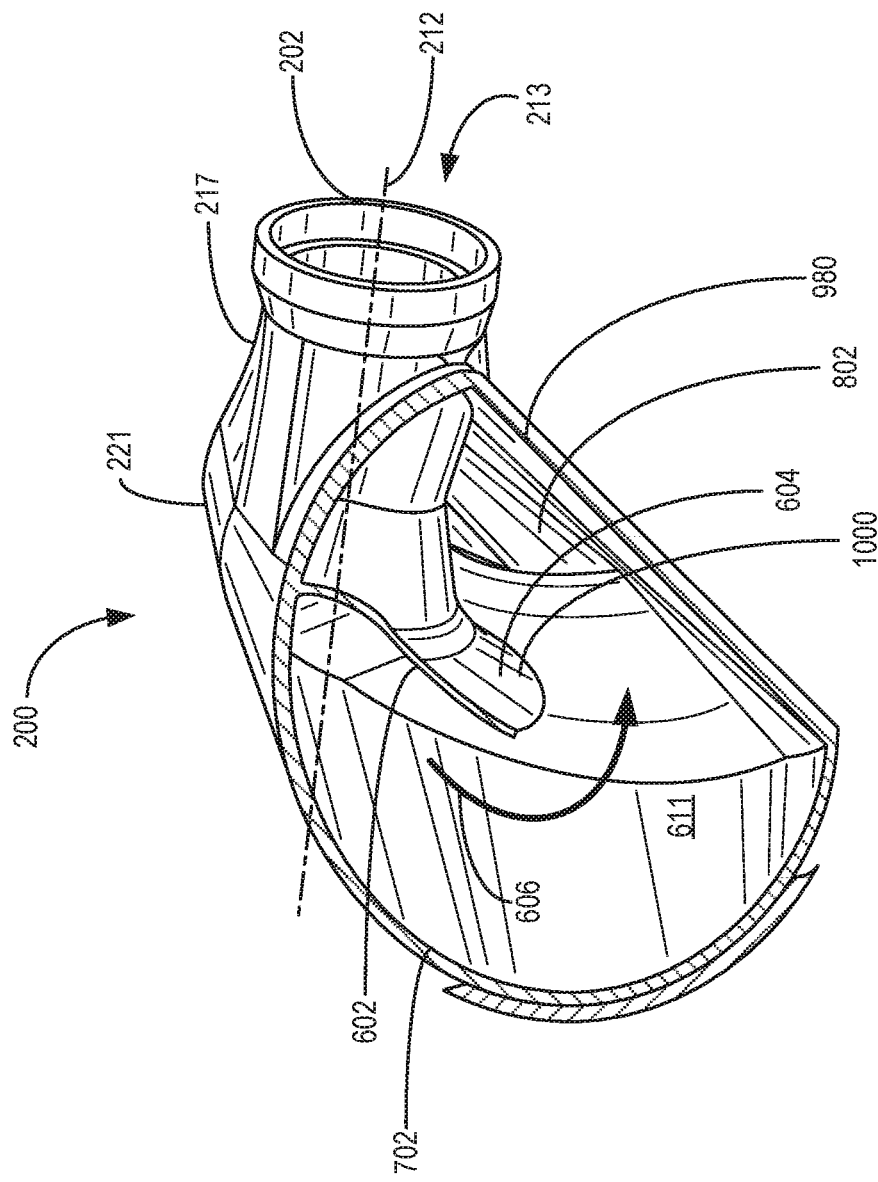
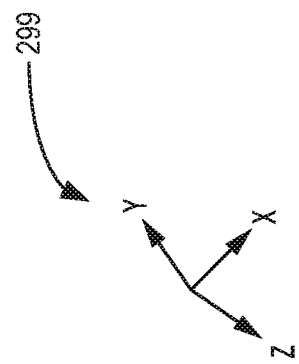
FIG. 10

FILLER INLET WITH FLUID SEPARATION

FIELD

The present description relates generally to methods and systems for a filler inlet of a fuel fill line of a motorized vehicle.

BACKGROUND/SUMMARY

Vehicles often include a fuel tank for storing liquid fuel, such as gasoline or diesel fuel. In order to refill the fuel tank with fuel, an operator may insert a fuel nozzle into fuel fill line coupled to the fuel tank and flow liquid fuel from the nozzle to the fuel tank via the fuel fill line. However, as fuel flows from the nozzle into the fuel fill line, air bubbles and/or foam may form around an outlet of the nozzle and increase a likelihood of premature nozzle shut-off and/or fuel overflow from the fuel fill line.

One example approach to address the above issues is shown by Marsala et al. in U.S. Pat. No. 6,405,767. Therein, a fuel fill pipe assembly for promoting less turbulent flow in a fuel pipe is disclosed. The assembly includes a pipe extending between a first end and a second end and at least one vane positioned on the pipe for urging the formation of at least a partial vortex within fuel that traverses through the pipe.

However, the inventors herein have recognized potential issues with such systems. As one example, a fill pipe such as that disclosed by the '767 patent may have a relatively small diameter in order to enable fuel flowing into the fill pipe to come into contact with flow altering features such as vanes. The decreased diameter of the fill pipe may result in an increased likelihood of air bubble and/or foam formation due to a reduced amount of space for the fuel to flow through the fill pipe. Additionally, fuel contacting the vanes may splash backward relative to a direction of fuel flowing from the nozzle, which may increase a likelihood of premature nozzle shut-off due to interference of the splashed fuel with a shut-off sensor of the nozzle.

In one example, the issues described above may be addressed by an apparatus, comprising: a first opening having a normal axis offset from, and neither perpendicular nor parallel to, a central axis of a fuel filler inlet of a vehicle, the first opening adapted to receive a fuel nozzle; a fuel/air separation chamber in the fuel filler inlet including a curved wall; and a flow guide curving into the chamber and positioned to guide tangential fuel flow against the curved wall away from the first opening. In this way, the fuel flowing tangentially against the curved wall may swirl through the fuel/air separation chamber, and air entrained with the fuel may be separated from the fuel within the chamber.

As one example, the fuel/air separation chamber extends at an angle relative to the opening of the fuel filler inlet in order to reduce a packaging space of the fuel filler inlet and increase an amount of swirl of the fuel. The fuel filler inlet may include a baffle positioned to reduce a likelihood that fuel may splash toward the fuel nozzle as the fuel flows through the fuel filler inlet from the fuel nozzle. In this way, a likelihood of formation of air bubbles and/or foam within the fuel filler inlet may be decreased, and a likelihood of premature shut-off of the fuel nozzle may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7-11 show different cross-sectional views of the filler inlet of FIGS. 2-6.

FIGS. 2-13 are shown to scale, though other relative dimensions may be used, if desired.

DETAILED DESCRIPTION

The present description is related systems and methods for a filler inlet of a fuel fill line of a motorized vehicle. The vehicle includes an engine system, such as the engine system shown by FIG. 1, having a fuel tank coupled to a fuel fill line. The fuel fill line includes a filler inlet, such as the filler inlet shown by FIGS. 2-13, with the filler inlet being adapted to receive a fuel nozzle. Fuel may flow from the fuel nozzle through the filler inlet, as shown by FIGS. 12-13, and features of the filler inlet increase an amount of swirl of the fuel in order to separate the liquid fuel from entrained air. Specifically, the filler inlet includes a baffle, a separation chamber, and a plurality of walls (as shown by FIGS. 7-11) configured to steer the flow of fuel through the filler inlet and into the fuel fill line while separating the air from the liquid fuel, as described regarding the method illustrated by FIG. 14. By structuring the filler inlet according to the examples described herein, an amount of air bubbles and foam produced by flowing the fuel into the filler inlet may be reduced, and a likelihood of premature fuel nozzle shut-off may be decreased.

Figure 1:
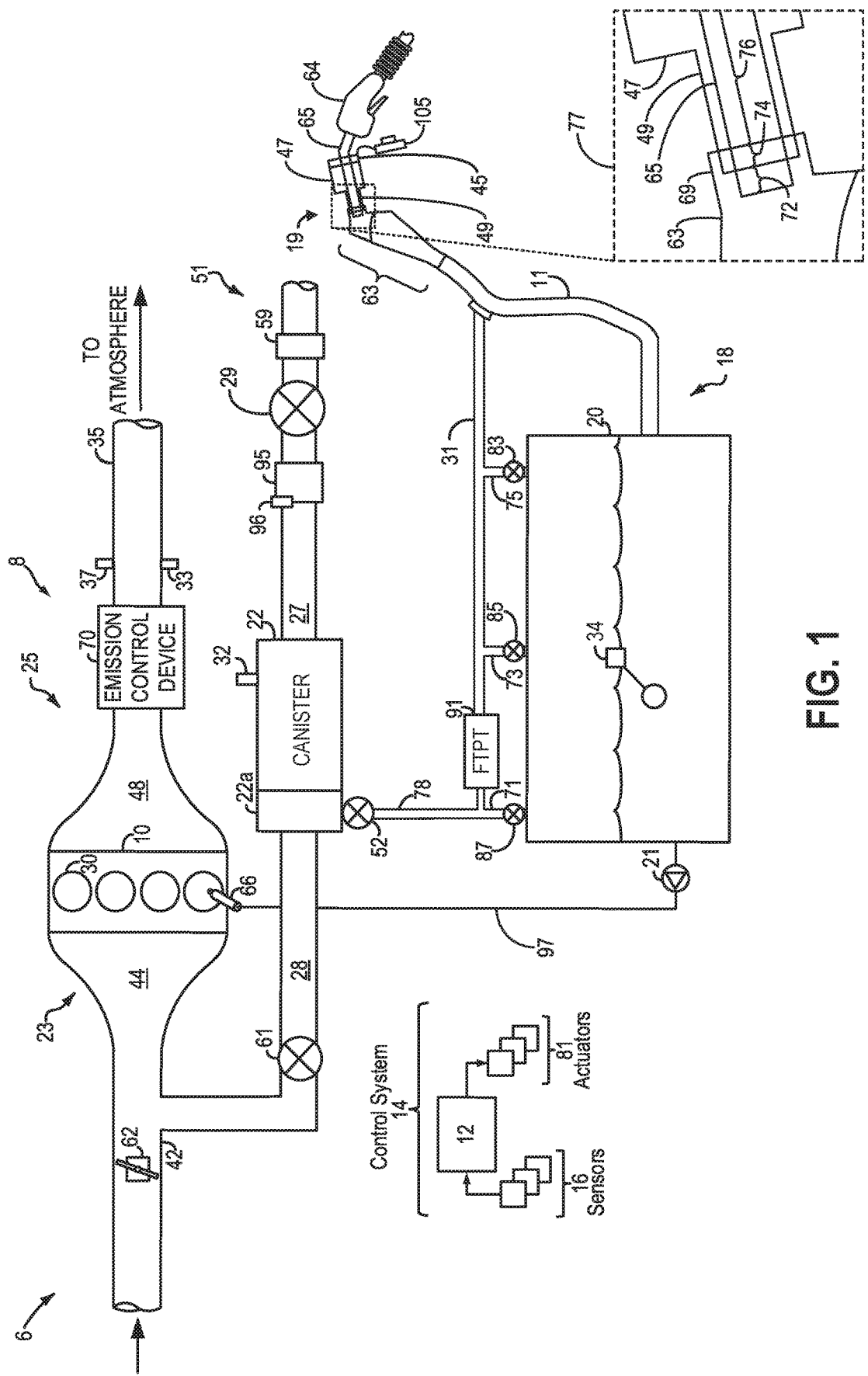
FIG. 1 schematically shows an engine system including a filler inlet coupled to a fuel fill line.
Figure 2:
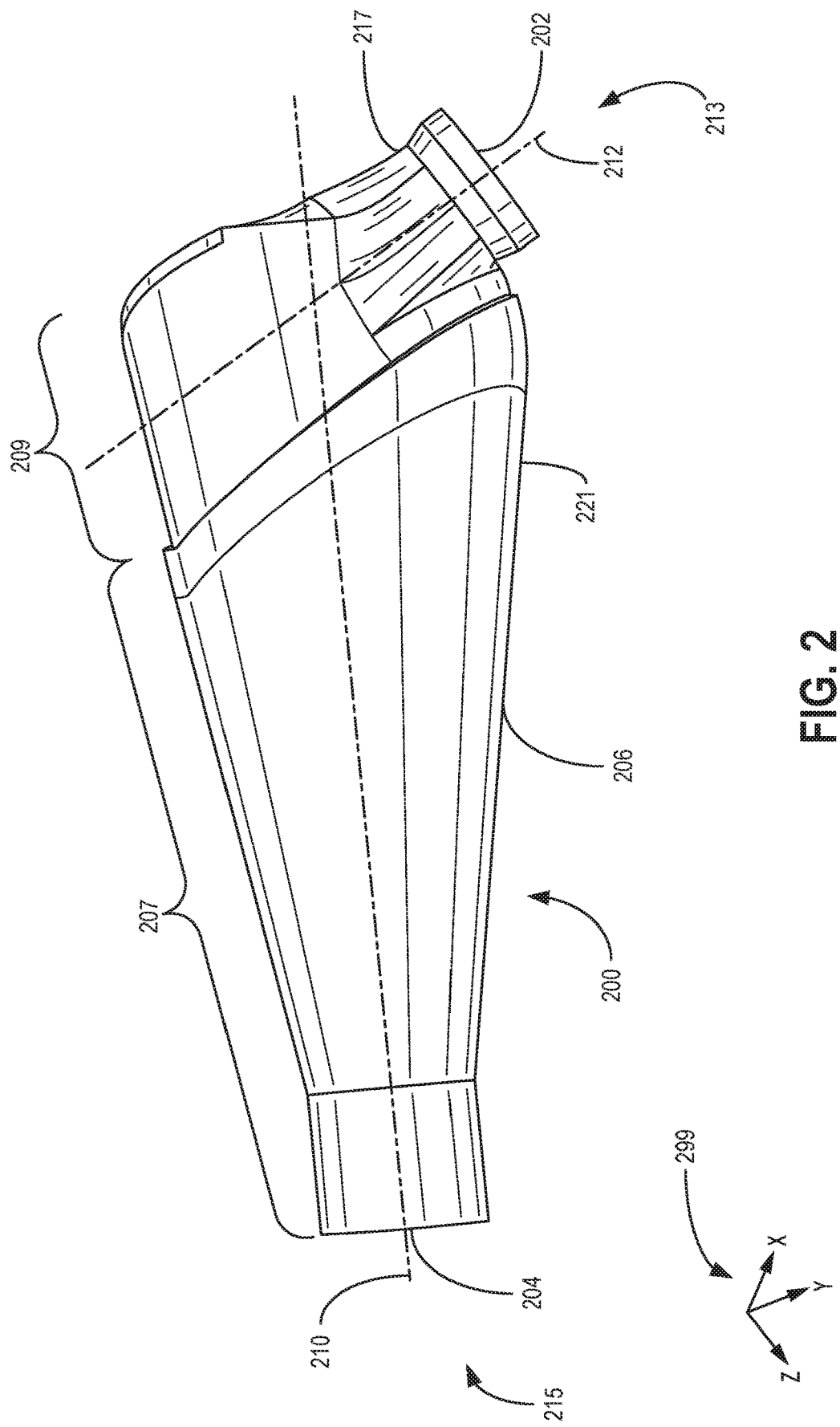
FIGS. 2-6 show different perspective views of a filler inlet for a fuel fill line.
Figure 3:
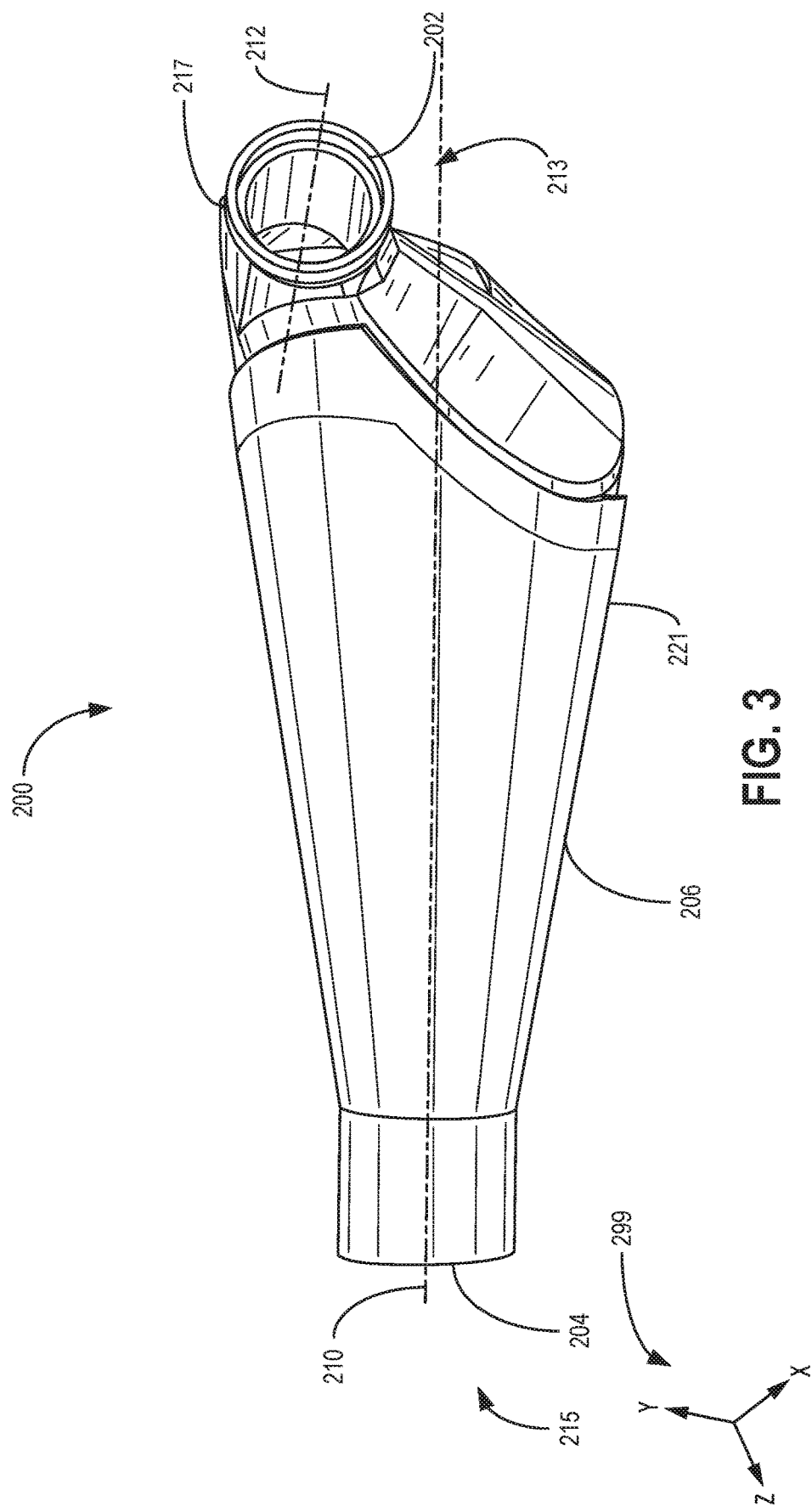
Figure 4:
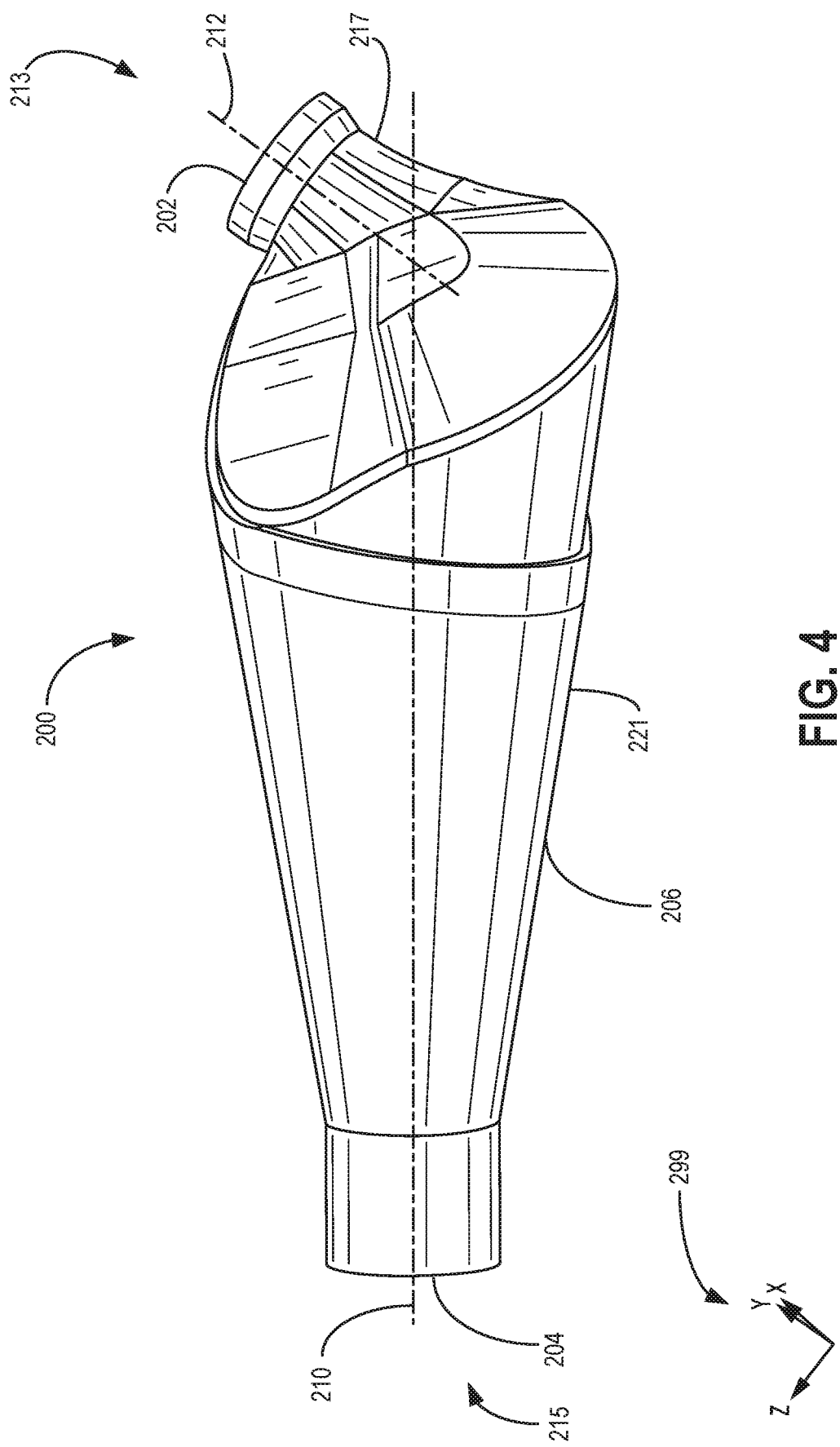
Figure 5:
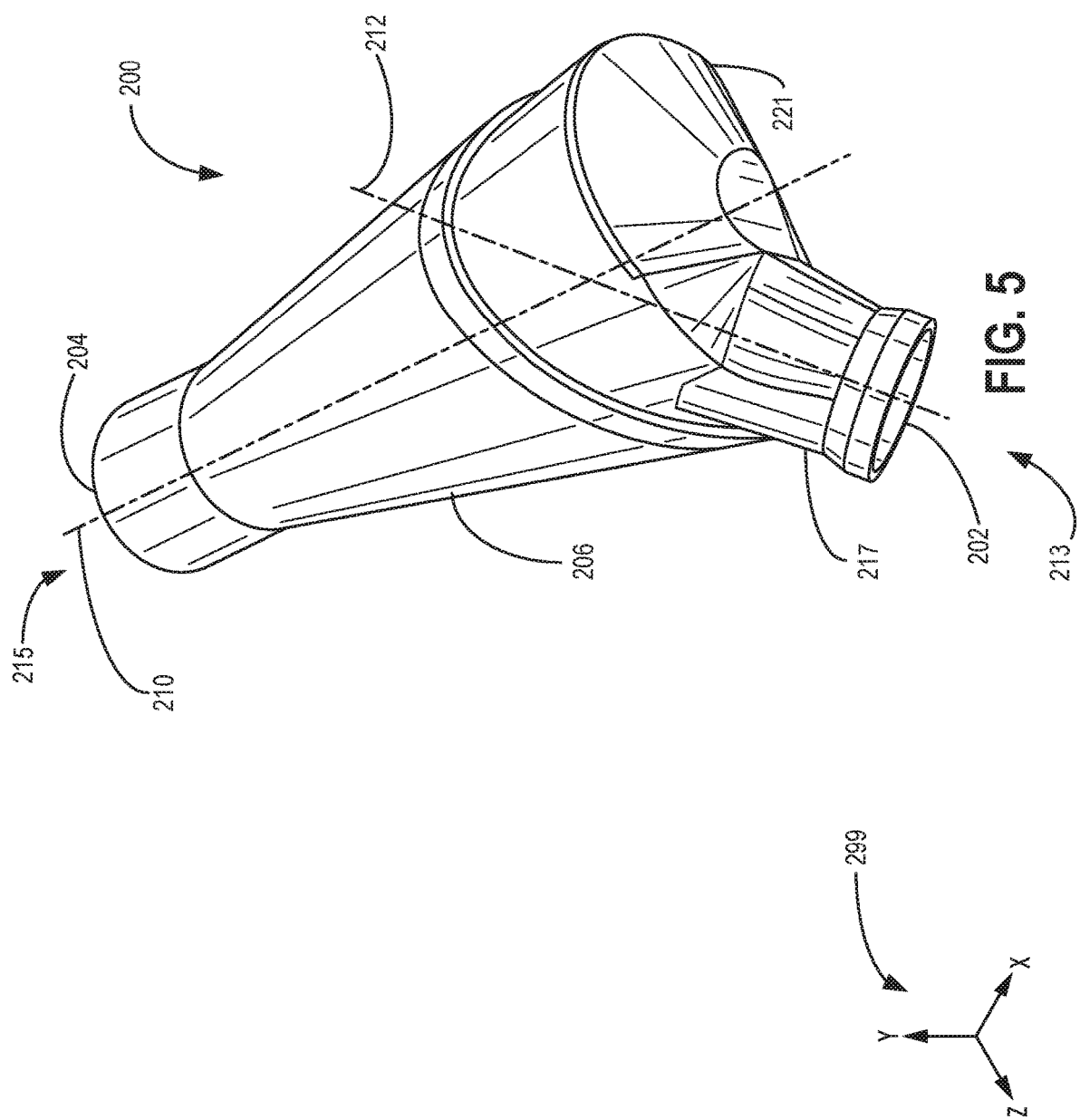
Figure 6:
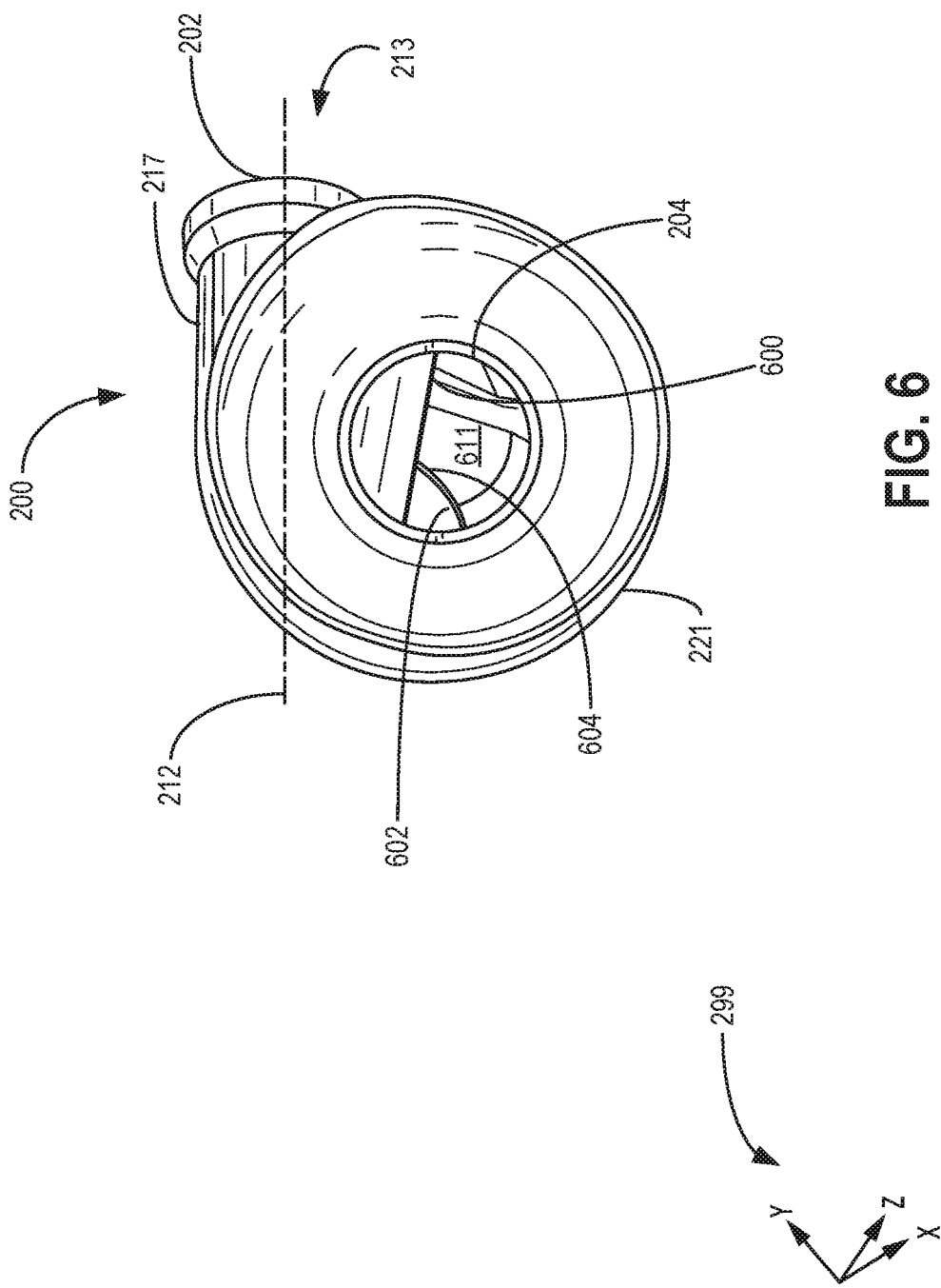
Figure 7:
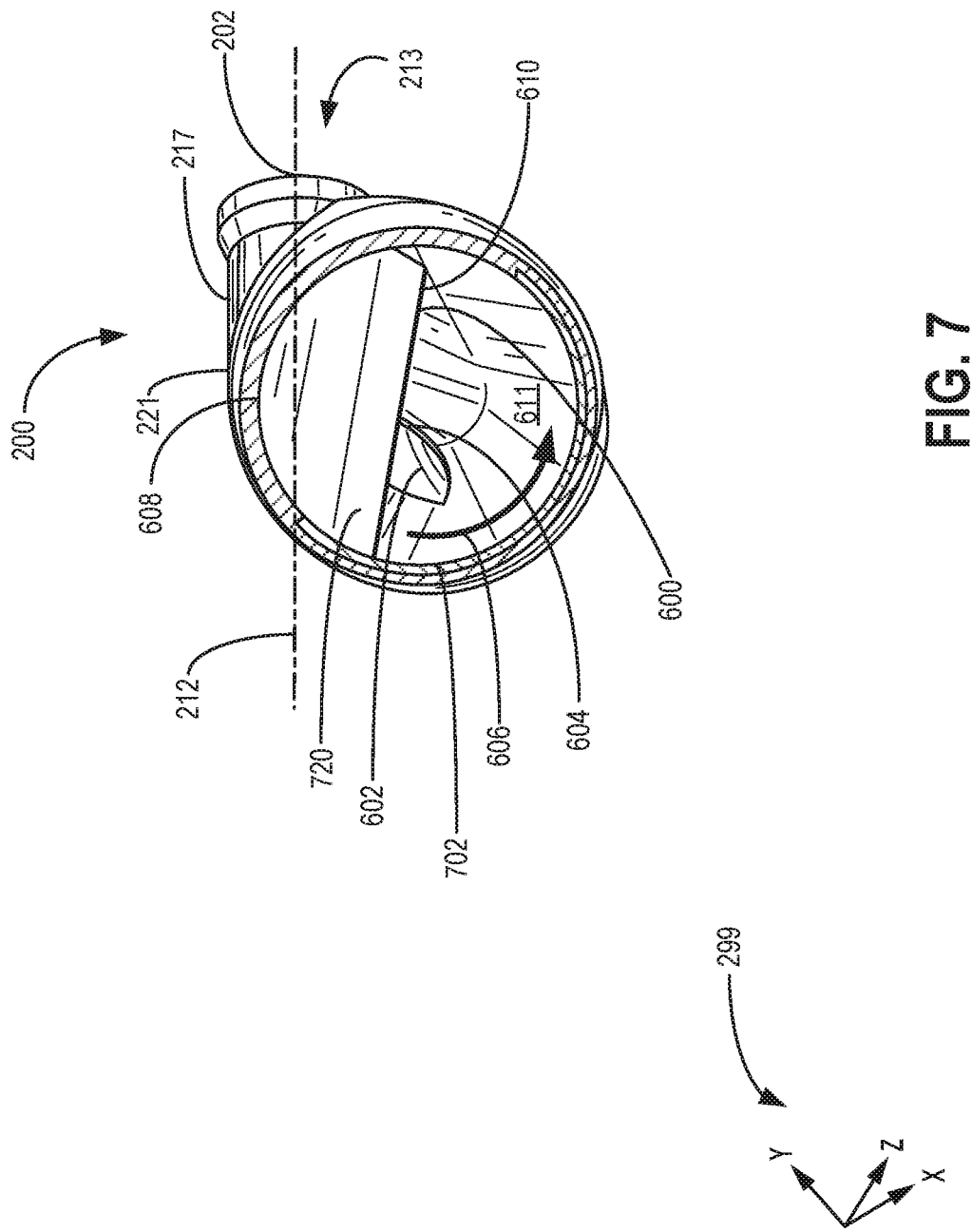

Referring now to FIG. 1, a schematic depiction of a vehicle system 6 is shown. The vehicle system 6 includes an engine system 8 coupled to an emissions control system 51 and a fuel system 18. Emission control system 51 may include a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the fuel injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Vapors generated in fuel system 18 may be routed to fuel vapor canister 22 via vapor recovery line 31 before being purged to the engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75.

Further, in some examples, one or more of the conduits 71, 73, or 75 may include one or more fuel tank vent valves. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit-venting valve (FLVV) 85, and conduit 75 may include a grade vent valve (GVV) 83. Further, in some examples, recovery line 31 may be coupled to a fuel filler system, herein also termed a refueling assembly 19.

Refueling assembly 19 is coupled to fuel tank 20 via a fuel fill line 11. In some examples, the fuel filler system 19 may be a capless system that does not include a fuel cap, and may instead include one or more pivotable doors, biasing members, etc. configured to seal the fuel filler system (e.g., seal an inlet of fuel fill line 11) from atmosphere without a cap. In other examples, fuel filler system 19 may include a fuel cap 105 for sealing off the fuel filler system from the atmosphere.

Refueling assembly 19 further includes a fill cup 47 coupled to fuel fill line 11. In some examples, fill cup 47 may be sealed from atmosphere by fuel cap 105. In other examples, fill cup 47 may be sealed from atmosphere by the one or more pivotable doors, biasing members, etc. described above. Fill cup 47 may include a passage 49 adapted to receive a fuel nozzle (e.g., nozzle 65) of a fuel dispenser (e.g., dispenser 64) in order to guide the nozzle into the inlet of fuel fill line 11. For example, the passage 49 of the fill cup 47 may have a first opening sealed by the fuel cap 105 or the one or more pivotable doors (e.g., as described with regard to a capless system), and the passage 49 of the fill cup 47 may have a second opening coupled to the inlet of the fuel fill line 11. In this configuration, the nozzle 65 may be inserted through both of the first opening and second opening of the passage 49 of the fill cup 47 and into the inlet of the fuel fill line 11. During conditions in which the nozzle 65 is inserted through the fill cup 47 into the inlet of the fuel fill line 11, the fill cup 47 may maintain a position of the nozzle 65 relative to the inlet of the fuel fill line 11 (e.g., constrain a movement of the fuel nozzle 65 within the inlet of the fuel fill line 11 in directions that are not parallel to a direction of insertion of the fuel nozzle 65 into the fill cup 47 and inlet of the fuel fill line 11).

Inset 77 shows an enlarged view of a portion of the refueling assembly 19, with the fuel nozzle 65 inserted into both of the fill cup 47 and filler inlet 63. In some examples, filler inlet 63 and fuel fill line 11 may be a single piece. For example, filler inlet 63 and fuel fill line 11 may be fused together (e.g., welded). In another example, filler inlet 63 and fuel fill line 11 may be formed together as a single piece (e.g., molded together). In other examples, filler inlet 63 may be a separate piece relative to fuel fill line 11 and may be coupled to fuel fill line 11 via one or more fasteners (e.g., bolts). The filler inlet 63 may be referred to herein as an apparatus, and/or the combined (e.g., fused or formed together) filler inlet 63 and fuel fill line 11 may be referred to herein together as an apparatus, in some examples.

In the configuration shown, a first portion 72 of the nozzle 65 is positioned within the filler inlet 63 and is encircled (e.g., surrounded) by a protruding portion 69 of the filler inlet 63, and is not encircled by the passage 49 of the fill cup 47. A second portion 74 of the nozzle 65 is positioned within both of the filler inlet 63 and the passage 49 of the fill cup 47, and is encircled by both of the protruding portion 69 and the passage 49 of the fill cup 47. A third portion 76 of the nozzle 65 is positioned within the fill cup 47 and is encircled by the passage 49 of the fill cup 47, and is not encircled by the protruding portion 69 of the filler inlet 63.

In some embodiments, fuel filler system 19 may include a refueling lock 45 (e.g., a fuel cap locking mechanism). The fuel cap locking mechanism may be configured to automatically lock the fuel cap in a closed position so that the fuel cap cannot be opened. For example, the fuel cap 105 may remain locked via refueling lock 45 while pressure or vacuum in the fuel tank is greater than a threshold. In response to a refuel request (e.g., a vehicle operator initiated request), the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 45 may be a filler pipe valve located at a mouth (e.g., inlet) of fuel fill line 11. In such embodiments, refueling lock 45 may not prevent the removal of fuel cap 105. Rather, refueling lock 45 may prevent the insertion of a refueling pump into fuel fill line 11. The filler pipe valve may be electrically locked, for example by a solenoid, or mechanically locked, for example by a pressure diaphragm.

In some embodiments, refueling lock 45 may be a refueling door lock, such as a latch or a clutch, which locks a refueling door located in a body panel of the vehicle. The refueling door lock may be electrically locked, for example by a solenoid, or mechanically locked, for example by a pressure diaphragm.

In embodiments that do not include fuel cap 105 (e.g., capless systems, as described above) a refueling access door may be positioned located in the body panel of the vehicle and refueling lock 45 may lock the refueling access door. Refueling lock 45 may operate as described in the above examples.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Emissions control system 51 may include one or more emissions control devices, such as fuel vapor canister 22, filled with an appropriate adsorbent. Fuel vapor canister 22 is configured to temporarily trap fuel vapors (including vaporized hydrocarbons) during fuel tank refilling operations and "running loss" (that is, fuel vaporized during vehicle operation). In one example, the adsorbent is activated charcoal. Emissions control system 51 may further include a canister ventilation path or vent line 27 which may route gases out of the canister 22 to the atmosphere when storing, or trapping, fuel vapors from fuel system 18.

Canister 22 may include a buffer 22a (or buffer region), with each of the canister and the buffer 22a including the adsorbent. A volume of buffer 22a may be smaller than (e.g., a fraction of) a volume of canister 22. The adsorbent in the buffer 22a may be same as, or different from, the adsorbent in the canister (e.g., both may include activated charcoal). Buffer 22a may be positioned within canister 22 such that during canister loading, fuel tank vapors may be first adsorbed within the buffer, and then when the buffer is saturated, further fuel tank vapors may be adsorbed in the canister. In comparison, during canister purging, fuel vapors may be first desorbed from the canister (e.g., to a threshold amount) before being desorbed from the buffer. In other words, loading and unloading of the buffer may not be linear with the loading and unloading of the canister. As such, the effect of the canister buffer is to dampen rapid increases in amounts of fuel vapor flowing from the fuel tank to the canister, thereby reducing the possibility of rapid increases in fuel vapor flowing to the engine. One or more temperature sensors 32 may be coupled to and/or within canister 22. As fuel vapor is adsorbed by the adsorbent in the canister, heat is generated (e.g., heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 27 may also allow fresh air to be drawn into canister 22 when purging stored fuel vapors from fuel system 18 to engine intake 23 via purge line 28 and purge valve 61. For example, purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

Flow of air and vapors between canister 22 and the atmosphere may be regulated by a canister vent valve 29. Canister vent valve 29 may be a normally open valve, so that vapor blocking valve 52 (VBV) may control venting of fuel tank 20 with the atmosphere. VBV 52 may be positioned between the fuel tank and the fuel vapor canister, which may be fluidically coupled via conduit 78. In some examples, VBV 52 may be located within canister 22. VBV 52 may be a normally closed valve, that when opened, allows for the venting of fuel vapors from fuel tank 20 to canister 22. Fuel vapors may then be vented to atmosphere via canister vent valve 29, or purged to engine intake 23 via canister purge valve 61.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open VBV 52 and canister vent valve 29 while closing canister purge valve (CPV) 61 to direct refueling vapors into canister 22 while preventing fuel vapors from being directed into the intake manifold.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 37 located upstream of the emission control device, temperature sensor 33, and pressure sensor 91. Other sensors such as pressure, temperature, air/fuel ratio, and composition sensors may be coupled to various locations in the vehicle system 6. As another example, the actuators may include fuel injector 66, throttle 62, vapor blocking valve 52, fuel pump of fuel pump system 21, and refueling lock 45. The control system 14 may include a controller 12. The controller 12 receives signals from the various sensors of FIG. 1 and employs the various actuators of FIG. 1 to adjust engine operation based on the received signals and instructions stored on a memory of the controller. For example, adjusting an amount of fuel flowing from the fuel tank 20 to the injector 66 may include adjusting an actuator of the fuel pump system 21 to adjust the flow of fuel through fuel line 97.

Leak detection routines may be intermittently performed by controller 12 on fuel system 18 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 95 communicatively coupled to controller 12. ELCM 95 may be coupled in vent 27, between canister 22 and the atmosphere. ELCM 95 may include a vacuum pump for applying negative pressure to the fuel system when administering a leak test. ELCM 95 may further include a reference orifice and a pressure sensor 96. Following the applying of vacuum to the fuel system, a change in pressure at the reference orifice (e.g., an absolute change or a rate of change) may be monitored and compared to a threshold. Based on the comparison, a fuel system leak may be diagnosed.

In some examples, vehicle system 6 may be a hybrid vehicle with multiple sources of torque available to one or more vehicle wheels. In other examples, vehicle system 6 is a conventional vehicle with only an engine, or an electric vehicle with only electric machine(s). In the example shown, vehicle system 6 includes engine 10 and an electric machine. The electric machine may be a motor or a motor/generator. The crankshaft of engine 10 and electric machine are connected via a transmission to vehicle wheels when one or more clutches are engaged. For example, a first clutch may be provided between the crankshaft and electric machine, and a second clutch may be provided between the electric machine and the transmission. Controller 12 may send a signal to an actuator of each clutch to engage or disengage the clutch, so as to connect or disconnect the crankshaft from the electric machine and the components connected thereto, and/or connect or disconnect the electric machine from the transmission and the components connected thereto. The transmission may be a gearbox, a planetary gear system, or another type of transmission. The powertrain may be configured in various manners including as a parallel, a series, or a series-parallel hybrid vehicle.

The electric machine receives electrical power from a traction battery to provide torque to the vehicle wheels. The electric machine may also be operated as a generator to provide electrical power to charge the battery, for example during a braking operation.

With regard to the fuel filler system 19 described above, fuel fill line 11 includes a filler inlet 63 adapted to receive a fuel nozzle 65. The filler inlet 63 includes features configured to increase a swirl (e.g., centrifugal flow) of fuel and air flowing into the filler inlet 63 from the fuel nozzle 65. The swirl directs liquid fuel toward a wall of the filler neck, and further directs air mixed with the liquid fuel toward a center of the filler neck and into the fuel fill line 11 toward the fuel tank 20. Air bubbles and/or foam resulting from the flow of liquid fuel from the fuel nozzle 65 into the filler inlet 63 is directed into the fuel fill line 11 as described above in order to reduce the amount of air bubbles and/or foam positioned proximate to an outlet of the fuel nozzle 65. As a result, issues associated with the air bubbles and/or foam, such as premature fuel nozzle shut-off, may be reduced.

As described above, the fuel filler system 19 may be a capless system or may include a fuel cap (e.g., fuel cap 105). The filler inlet 63 may be utilized with a variety of different capped or capless fuel filler system configurations in order to increase fuel swirl as described above. During conditions in which the fuel nozzle 65 is inserted into the filler inlet 63, the filler inlet 63 is configured to position the fuel nozzle 65 such that fuel/air mixture flowing into the filler inlet 63 flows against a curved (e.g., circular) wall of the filler inlet 63 in a tangential direction of the curved wall. The fuel/air mixture expands along the curved wall, resulting in a swirling of the fuel/air into a separation chamber of the filler inlet 63. In some examples, the separation chamber may have a conical shape. The separation chamber is positioned at an angle of approximately 90° relative to an opening of the filler inlet 63 adapted to receive the fuel nozzle 65 to enable the fuel/air mixture flowing in the tangential direction to flow into the separation chamber. Because the liquid fuel is heavier than the air, the liquid fuel has an increased tendency to flow toward the walls of the separation chamber while the air has an increased tendency to flow toward a center of the separation chamber. The separated liquid fuel and air may then flow through the separation chamber into the fuel fill line 11 and into the fuel tank 20.

Fuel nozzles, such as fuel nozzle 65, often include a shut-off sensor configured to stop a flow of fuel from the nozzle during conditions in which the shut-off sensor is surrounded by liquid fuel (e.g., during conditions of fuel overflow, as one example). However, accumulation of air bubbles and/or foam around the outlet of the fuel nozzle may interfere with the shut-off sensor and result in premature shut-off of the fuel nozzle (e.g., shut-off of the fuel nozzle prior to fully filling the fuel tank 20 with fuel). In order to reduce a likelihood of premature shut-off, the filler inlet 63 includes a baffle and flow deflector (e.g., flow guide). The baffle and flow deflector are configured to reduce a likelihood that swirling fuel/air mixture within the filler inlet 63 splashes in a direction toward the outlet of the fuel nozzle 65, thereby reducing a likelihood that the swirling flow will interfere with operation of the shut-off sensor of the fuel nozzle 65. Examples of a filler inlet similar to the filler inlet 63 are described below with reference to FIGS. 2-13.

FIGS. 2-6 each show different perspective views of a filler inlet 200 for a fuel fill line (e.g., fuel fill passage, such as fuel fill line 11 shown by FIG. 1 and described above). In some examples, the filler inlet 200 may be similar to the filler inlet 63 shown by FIG. 3 and described above. FIGS. 2-13 each include reference axes 299 for relative comparison of the views shown.

Filler inlet 200 includes a body 206 having a first opening 202 and a second opening 204. The first opening 202 and second opening 204 may each be referred to herein as ports. The second opening 204 may be referred to herein as an outlet of the filler inlet 200. In the examples described herein, first opening 202 and second opening 204 are the only openings of the filler inlet 200 positioned at an exterior 221 of the filler inlet 200. Specifically, filler inlet 200 includes no other openings through which fuel or other fluids (e.g., air) may flow apart from first opening 202 and second opening 204. In some examples, body 206 may be formed as a single piece (e.g., molded or cast as a single unit). In other examples, body 206 may be formed of two or more sections (e.g., pieces). In the examples shown by FIGS. 2-13, the body 206 includes a first section 207 and a second section 209. First section 207 and second section 209 may each be formed as separate parts and may be assembled together in order to form the body 206. In some examples, first section 207 and second section 209 may be press fit together, fused together (e.g., welded), fastened together (e.g., via bolts, etc.), or may include features shaped to lock the first section 207 and second section 209 together (e.g., notches of the first section 207 shaped to engage with protrusions of the second section 209, and/or vice versa). Body 206 forms the exterior 221 of the filler inlet 200.

First opening 202 is formed by a protruding portion 217 of the body 206 positioned at a first end 213 of the filler inlet 200. Second opening 204 is positioned at a second end 215 of the filler inlet 200. First opening 202 is adapted to receive a fuel nozzle (e.g., fuel nozzle 65 shown by FIG. 1 and described above). Further, first opening 202 may be adapted to couple with a passage of a fuel fill cup (e.g., fill cup 47 shown by FIG. 1 and described above). Specifically, the protruding portion 217 may be shaped to engage with the passage of the fill cup in order to fluidly couple the fill cup with the filler inlet 200.

Figure 9:
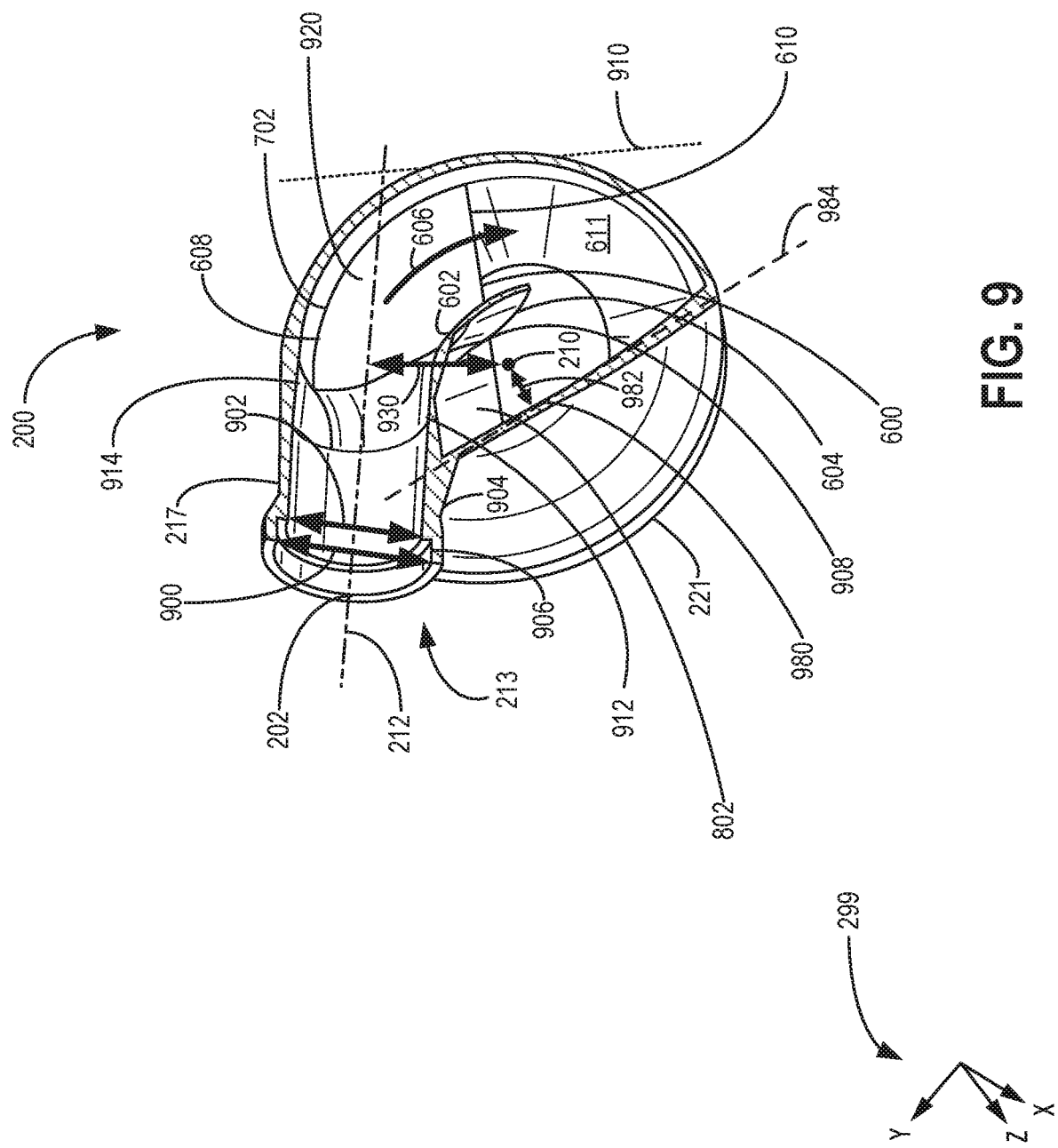

In one example, a diameter of the passage of the fill cup may be smaller than a diameter of the first opening 202, and the passage of the fill cup may be positioned within the first opening 202 and coupled to the protruding portion 217 (e.g., press fit into the opening, fastened to the opening, fused with the opening, etc.). As shown by FIG. 9, the first opening 202 may have a first diameter 900, and may further include an offset step portion 904 having a second diameter 902, with the second diameter 902 being less than the first diameter 900. Step portion 904 may engage in face-sharing contact with one or more surfaces of the passage of the fill cup in order to align the passage of the fill cup within the protruding portion 217. For example, the passage of the fill cup may be inserted into the first opening 202 and may be seated against the step portion 904. A inner section 906 of the protruding portion 217 of the body 206 may extend in a direction parallel to a normal direction of the first opening 202 (e.g., in a direction of axis 212, which may be referred to herein as a normal axis, and a direction of insertion of the fuel nozzle into the first opening 202), and during conditions in which the passage of the fill cup is positioned within the protruding portion 217, an outer surface (e.g., outer circumferential surface) of the passage of the fill cup may engage in face-sharing contact with a perimeter (e.g., circumferential surface) of the inner section 906. An example of the protruding portion 217 engaging within a passage 1202 of a fill cup 1200 (e.g., similar to fill cup 47) is shown by FIGS. 12-13 and described further below.

In another example, the diameter of the passage of the fill cup may be larger than the diameter of the first opening 202 and larger than a diameter of the protruding portion 217, and the passage of the fill cup may be positioned to surround an outer perimeter of the protruding portion 217 (e.g., the protruding portion 217 may be positioned partially within the passage of the fill cup and coupled to the passage of the fill cup via press fitting, fasteners, welding, etc.). In such examples, the protruding portion 217 may include one or more offset step portions positioned around (e.g., formed by) an outer perimeter of the protruding portion 217, and surfaces of the passage of the fill cup may engage in face-sharing contact with the one or more offset step portions. For example, one or more lips, ledges, etc. may be positioned around the outer perimeter of the protruding portion 217 in order to align the passage of the fill cup with the first opening 202 and/or maintain the passage of the fill cup in engagement with the protruding portion 217.

In order to flow fuel into the filler inlet 200 during conditions in which the filler inlet 200 is coupled with the fill cup (as described above), the fuel nozzle may be inserted through each of the passage of the fill cup (e.g., passage 1202 of fill cup 1200) and the first opening 202 of the protruding portion 217. Specifically, the passage of the fill cup is engaged with the protruding portion 217 of the filler inlet 200 such that an opening of the passage of the filler cup is aligned with the first opening 202 of the protruding portion 217, fluidically coupling the passage of the filler cup with the first opening 202 of the filler inlet 200. In this configuration, the fuel nozzle is inserted into the passage of the filler cup and may slide through the passage of the filler cup into the protruding portion 217 of the filler inlet 200 via the first opening 202, such that a first portion of the fuel nozzle (similar to first portion 72 of nozzle 65 of FIG. 1) is positioned within the protruding portion 217 and is not encircled by the passage of the filler cup, a second portion of the fuel nozzle (similar to second portion 74 of nozzle 65 of FIG. 1) is positioned within the passage of the fill cup and is encircled by both of the passage of the filler cup and the protruding portion 217, and a third portion of the fuel nozzle (similar to third portion 76 of nozzle 65 of FIG. 1) is positioned within the passage of the fill cup and is not encircled by the protruding portion 217. In one example, the fuel nozzle is inserted into the passage of the filler cup and the first opening 202 in a configuration similar to the configuration of the fuel nozzle 65 with respect to fill cup 47 and filler inlet 63, as shown by the enlarged view of inset 77 of FIG. 1. Fuel may then flow from the fuel nozzle into the filler inlet 200.

Axis 210 (which may be referred to herein as a central axis and/or a normal axis relative to second opening 204) and axis 212 (which may be referred to herein as an axis normal to first opening 202) are shown by FIGS. 2-13 in order to illustrate a position of the first opening 202 relative to the second opening 204. Specifically, first opening 202 is positioned at an angle relative to the second opening 204. For example, fuel may flow through the filler inlet 200 by flowing into the first opening 202 in a direction of axis 212 (e.g., by inserting the fuel nozzle through the first opening 202 and flowing fuel from the fuel nozzle into the filler inlet 200), flowing the fuel through the body 206, and flowing fuel from the body 206 through second opening 204 in a direction of axis 210, with the axis 210 being angled relative to the axis 212. An axis normal to the second opening 204 is coaxial with the axis 210 (e.g., axis 210 is positioned normal to the second opening 204). In the examples shown by FIGS. 2-13, the axis 210 and the axis 212 are not perpendicular relative to each other and are angled relative to each other by an amount greater than 0 degrees. In this configuration, the normal axis of the second opening 204 (e.g., axis 210) is not parallel and not perpendicular to the normal axis of the first opening 202 (e.g., axis 212). Further, the axis 210 and axis 212 do not intersect each other, as indicated by FIG. 9. Specifically, axis 212 is offset from the axis 210 by distance 908, with the distance 908 being in a radial direction of the axis 210.

In the configuration described above (e.g., with the second opening 204 being angled relative to the first opening 202), a size of the filler inlet 200 (e.g., a length of the filler inlet 200) in the direction of the axis 212 may be reduced relative to filler inlets that include openings that are not angled relative to each other (e.g., parallel openings) or openings that are positioned perpendicular to each other (e.g., with axes normal to the openings being orthogonal relative to each other). For example, because a length of the filler inlet 200 along axis 212 is less than a length of the filler inlet 200 along axis 210, and because the axis 212 is angled relative to the axis 210, the amount by which the filler inlet 200 extends in a transverse direction (e.g., axle direction, perpendicular to a centerline and drive direction of the vehicle) of a vehicle (e.g., the vehicle including engine system 8 described above with reference to FIG. 1) may be reduced during conditions in which the filler inlet 200 is coupled to the vehicle (e.g., coupled to the passage of the filler cup as described above and positioned within an interior of a body of the vehicle). By reducing the amount of extension of the filler inlet 200 into the vehicle in the transverse direction of the vehicle, the filler inlet 200 may more easily fit into smaller spaces (e.g., pockets of the body of the vehicle).

Further, by offsetting the first opening 202 and the second opening 204 relative to each other (e.g., offsetting the first opening 202 in the radial direction of axis 210 such that the axis 212 through the first opening 202 and the axis 210 through the second opening 204 do not intersect), an amount of swirl of fuel flowing through the filler inlet 200 may be increased. For example, during conditions in which the filler inlet 200 is coupled to the vehicle (e.g., the vehicle including engine system 8 described above with reference to FIG. 1), first opening 202 may be positioned vertically higher than second opening 204 relative to a surface on which the vehicle sits. As fuel flows from the fuel nozzle into the filler inlet 200 via insertion of the fuel nozzle into the first opening 202, gravity may accelerate the flow of the fuel from the fuel nozzle in the direction of the second opening 204 and toward the fuel fill line and fuel tank of the vehicle (e.g., fuel fill line 11 and fuel tank 20 shown by FIG. 1 and described above). Because the second opening 204 is angled relative to the first opening 202 as described above, as the flow of fuel is accelerated through the filler inlet due to gravity (with the fuel including an initial flow speed resulting from a pressure of fuel within the nozzle), the direction of the fuel flow (which is initially in the direction of axis 212) is altered by surfaces of the filler inlet 200 such that a swirl of the fuel flow is increased and the fuel is directed by the surfaces in the direction of axis 210 (e.g., toward second opening 204). In particular, the swirl of the fuel in a circumferential direction around axis 210 is increased (e.g., accelerated) in part due to the acceleration of the fuel through the filler inlet 200 by gravity, as described further below.

As shown by FIGS. 6-11, the filler inlet 200 includes a fuel/air separation chamber 611 formed within an interior of the body 206 of the filler inlet 200. During conditions in which fuel flows into the filler inlet 200 (e.g., via the fuel nozzle inserted into first opening 202), the liquid fuel may entrain air (e.g., atmospheric air). For example, air may be entrained by the liquid fuel due to a shut-off sensor of the fuel nozzle being fluidly coupled to atmosphere. In another example, air may be entrained by the liquid fuel due to an opening and/or closing of the fill cup (e.g., fill cup 1200) as the fuel nozzle is inserted through the passage of the fill cup and into the filler inlet. The mixture of liquid fuel and entrained air may flow together into the fuel/air separation chamber 611, and due to the configuration of the fuel/air separation chamber 611, the liquid fuel and entrained air are separated from each other within the fuel/air separation chamber 611. Specifically, as the fuel/air mixture flows into the fuel/air separation chamber 611, the liquid fuel may flow along surfaces forming an inner perimeter of the fuel/air separation chamber 611 in a helical direction around axis 210, as shown by arrow 1104. Due to the reduced density of the air relative to the liquid fuel, as the liquid fuel swirls within the fuel/air separation chamber 611 (e.g., around axis 210 in the direction of arrow 1104), the entrained air has a tendency to separate from the liquid fuel and accumulate within a center of the fuel/air separation chamber 611 (e.g., along axis 210). The liquid fuel may flow in the circumferential direction toward the second opening 204 (e.g., in a flow having a helical shape tapering in diameter toward the second opening 204), and the separated air may flow in a direction parallel to axis 210 toward the second opening 204. As the liquid fuel and separated air flow toward the second opening 204, the separated air may be insulated from the walls and surfaces (e.g., inner perimeter) of the fuel/air separation chamber 611 by the liquid fuel. By separating the air from the liquid fuel and flowing the air and liquid fuel separately through the fuel/air separation chamber 611 to the second opening 204, a likelihood of foam and/or air bubbles forming within the filler inlet 200 may be reduced.

In the examples shown, the fuel/air separation chamber 611 has a conical shape tapering from a larger, first diameter 1100 at the first end 213 of the filler inlet 200 to a smaller, second diameter 1102 at the second end 215 of the filler inlet 200 (e.g., with the fuel/air separation chamber 611 tapering in diameter in a direction from the first end 213 to the second end 215). The second opening 204 and second end 215 may each have the same, second diameter 1102. The first diameter 1100 may be greater than each of the second diameter 1102 (e.g., a diameter of the second opening 204) and the diameter of the first opening 202 (e.g., diameter 900 and/or diameter 902). During conditions in which the filler inlet 200 is coupled to the vehicle (e.g., similar to the configuration of filler inlet 63 coupled to fuel fill line 11 shown by FIG. 1), the first end 213 of the filler inlet 200 may be positioned vertically above the second end 215 of the filler inlet 200 relative to the ground surface on which the vehicle sits, such that the second opening 204 is positioned vertically below (e.g., in a vertical direction of the vehicle or direction of gravity) the first opening 202 and the fuel/air separation chamber 611 relative to the ground surface. In this configuration, fuel may flow from the fuel nozzle with an initial, non-zero flow speed or flow rate, and gravity may accelerate the fuel as the fuel flows through the fuel/air separation chamber from the first end 213 (e.g., with the larger, first diameter 1100) toward the second end 215 (e.g., with the smaller, second diameter 1102). The acceleration due to gravity may increase the amount of swirl of the liquid fuel along the surfaces of the fuel/air separation chamber 611 (e.g., increase a tendency of the liquid fuel to flow in the helical direction along the surfaces forming the inner perimeter of the fuel/air separation chamber as indicated by arrow 1104).

The filler inlet 200 further includes a flow guide 602 configured to direct the flow of fuel from the fuel nozzle (e.g., during conditions in which the fuel nozzle is inserted through the first opening 202) toward the fuel/air separation chamber 611. Specifically, the fuel/air separation chamber 611 includes a curved wall 702 (as shown by FIGS. 7-11) positioned opposite to the flow guide 602, such that fuel flowing along the flow guide 602 may flow from the flow guide 602 into the fuel/air separation chamber 611 in a tangential direction of the curved wall 702 (e.g., in a direction of axis 910 shown by FIG. 9, with the axis 910 being positioned tangentially relative to the curved wall 702 and perpendicular to the axis 210). As the fuel flows from the flow guide 602 in the tangential direction of the curved wall 702, gravity may accelerate the fuel flow in the tangential direction along the curved wall 702 (e.g., in direction 606 of the curvature of the curved wall 702). The fuel may then continue to flow along the inner perimeter of the fuel/air separation chamber 611 in the helical direction indicated by arrow 1104, as described above, with the liquid fuel separating from air entrained with the fuel. Fuel flowing in the tangential direction of the curved wall 702 may be referred to herein as a tangential fuel flow.

The flow guide 602 extends into the interior of the filler inlet 200 from the protruding portion 217 and curves in a direction away from axis 212. Specifically, the flow guide 602 is a curved surface curving in a direction around the axis 210, away from the axis 212, and away from the protruding portion 217. The flow guide 602 is joined with a lower end 912 of the protruding portion 217 and the curved wall 702 is joined with an upper end 914 of the protruding portion 217, as shown by FIG. 9. In this configuration, during conditions in which the filler inlet 200 is coupled to the vehicle (e.g., with the first opening 202 being positioned vertically higher than the second opening 204, as described above), the lower end 912 of the protruding portion 217 is positioned vertically lower than the upper end 914 of the protruding portion 217 relative to the ground surface on which the vehicle sits. The curvature of the flow guide 602 (e.g., as described above, with the flow guide curving away from the upper end 914 and toward the fuel/air separation chamber 611) enables fuel flowing from the fuel nozzle to be accelerated by gravity in the tangential direction of the curved wall 702 as the fuel is guided (e.g., directed) from the fuel nozzle by the flow guide 602.

Figure 8:
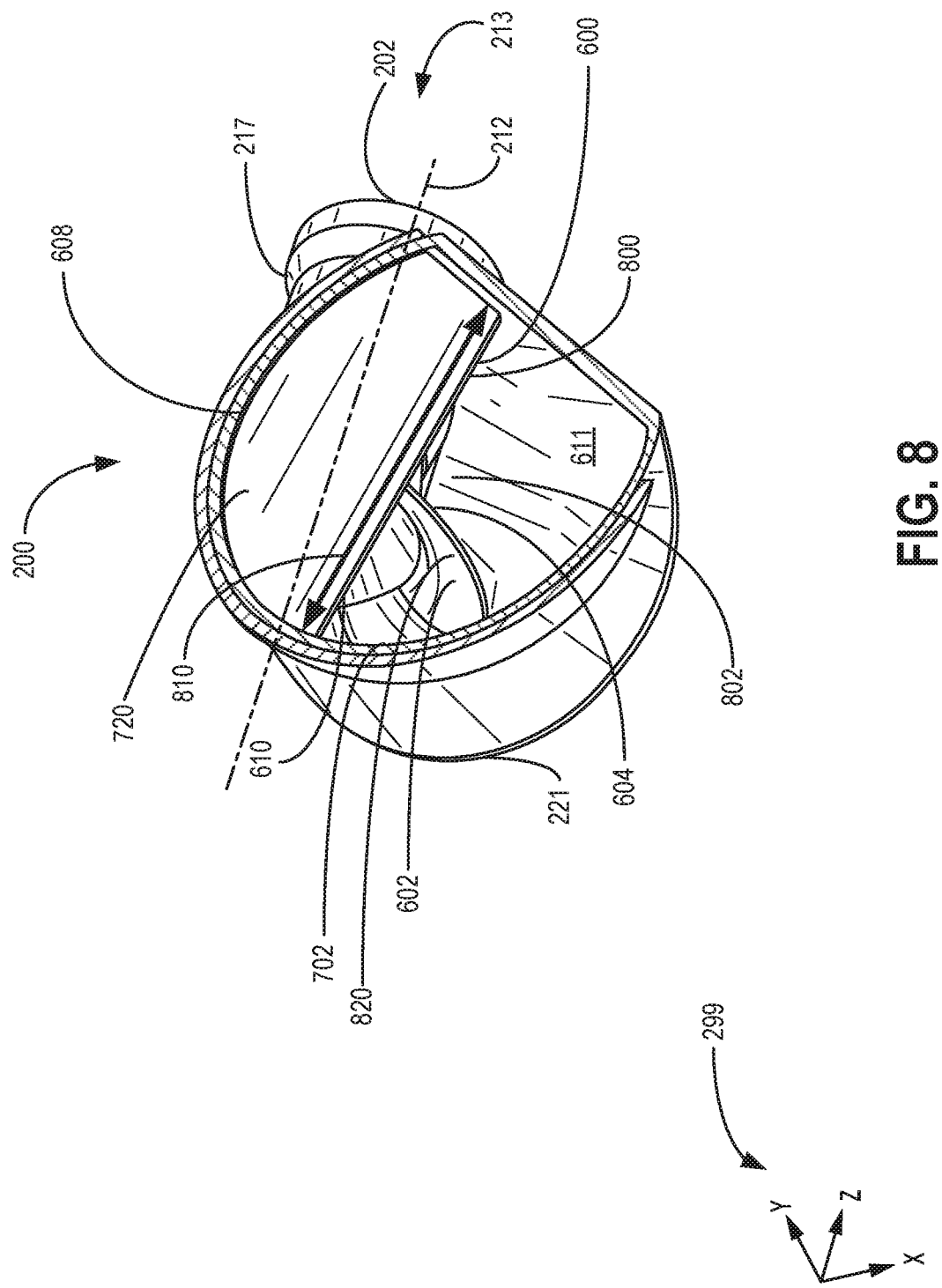
Figure 11:
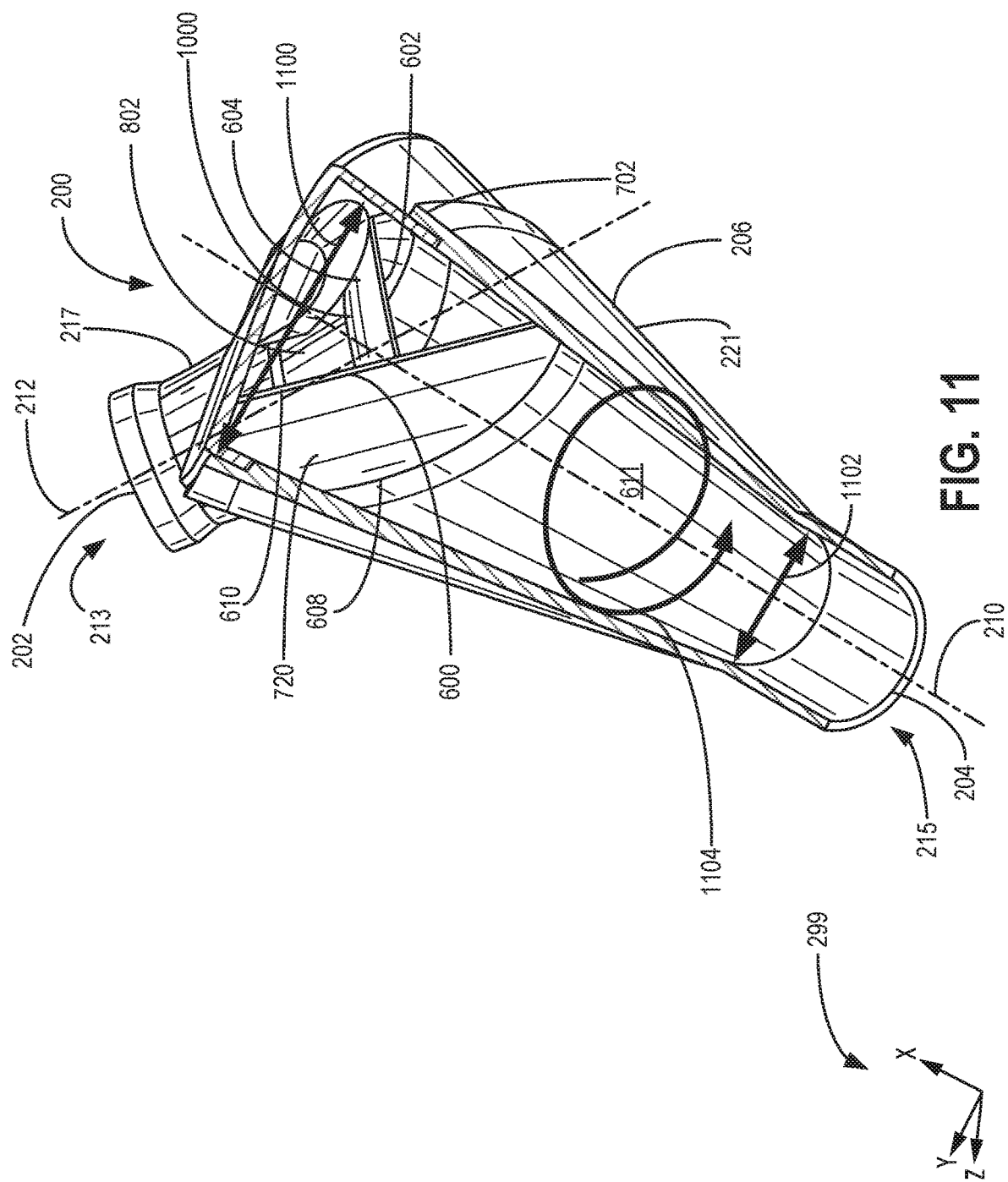
Figure 12:
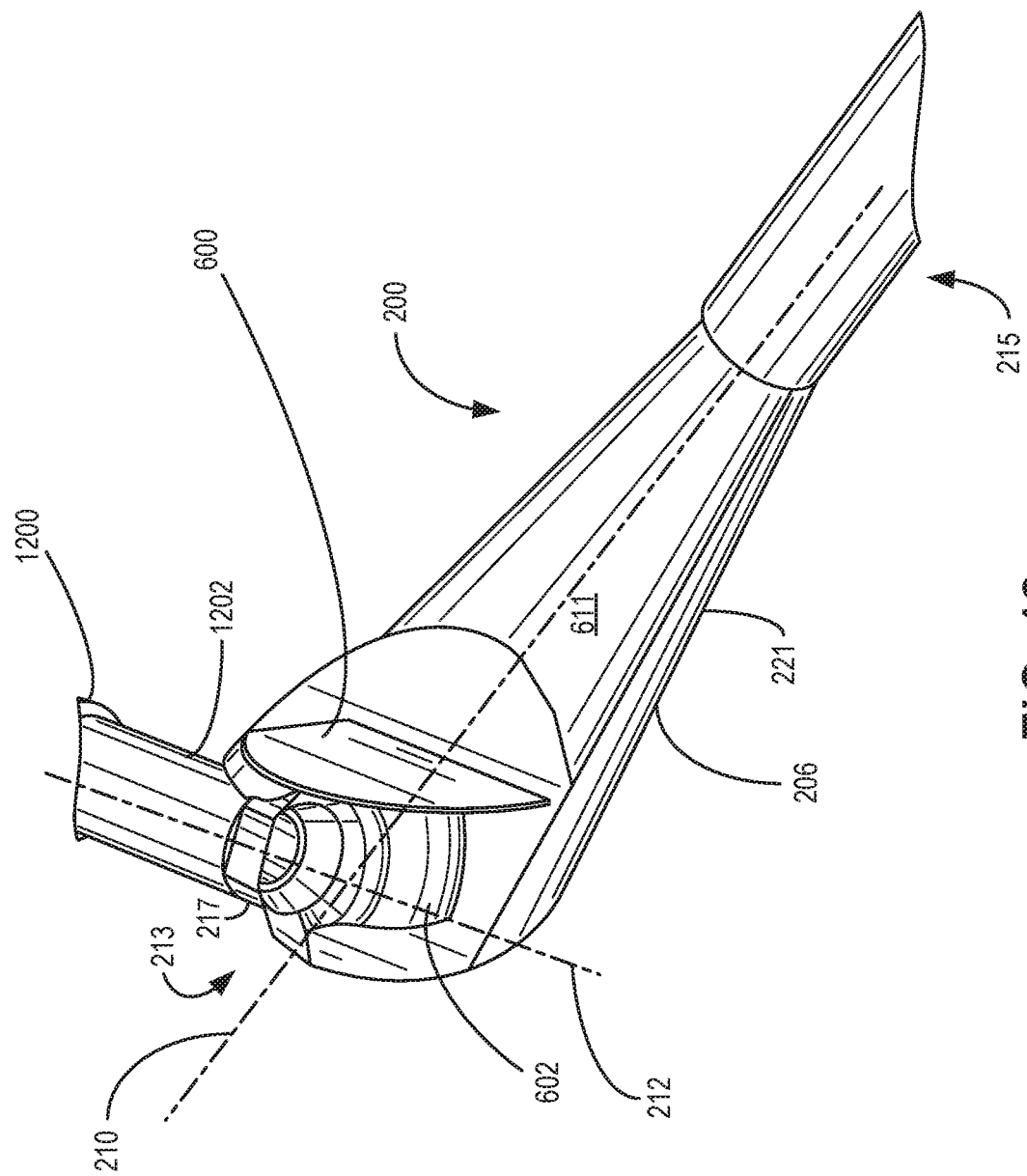
FIGS. 12-13 show an interior of the filler inlet of FIGS. 2-11 and illustrate a flow path of fuel through the filler inlet.
Figure 13:
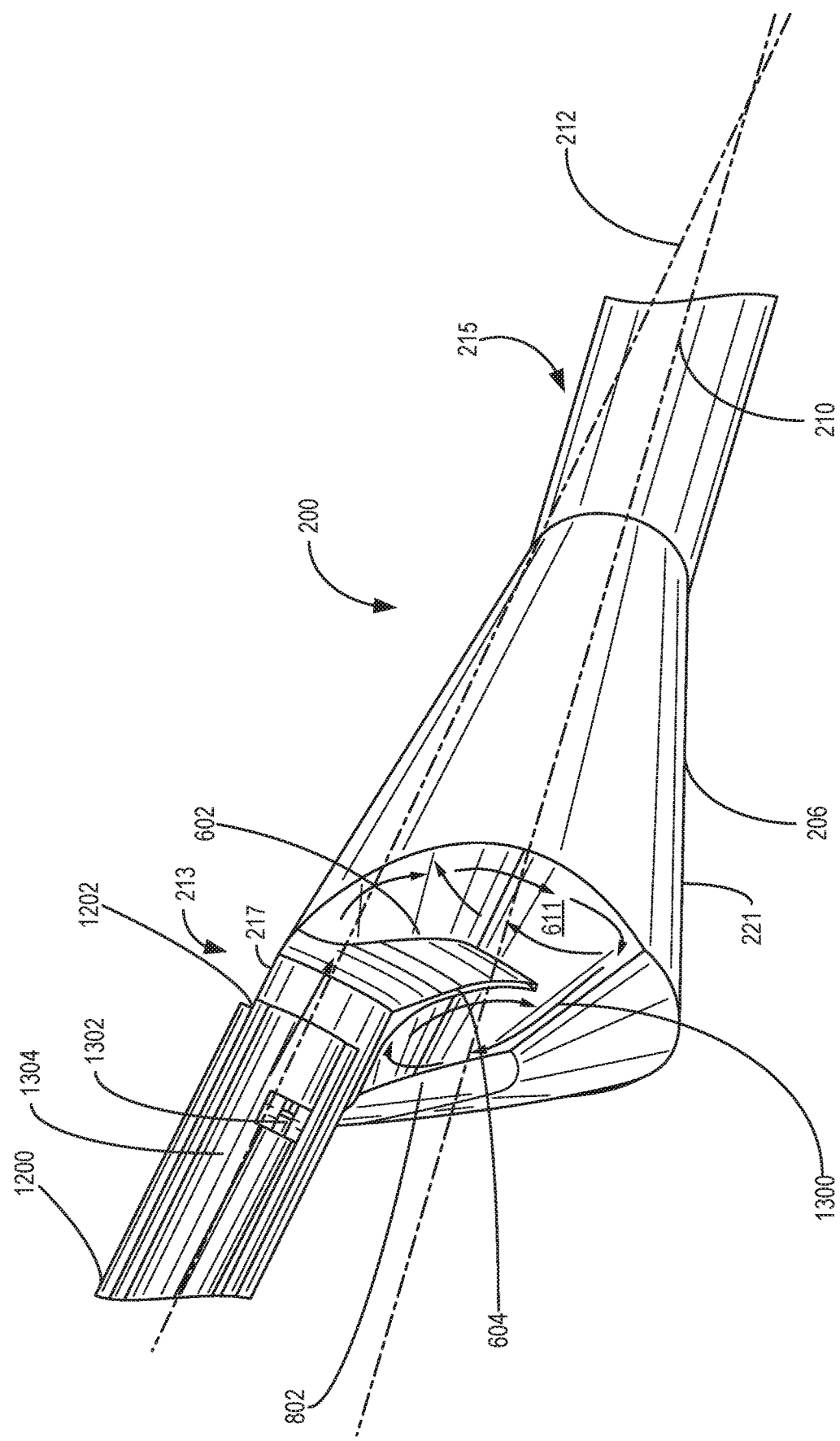

In some examples, the filler inlet 200 may include a baffle 600, as shown by FIGS. 6-9 and 11-13. The baffle 600 is positioned downstream of the flow guide 602 within the interior of the filler inlet 200 relative to the direction of fuel flow from the first opening 202 to the second opening 204. As shown by FIG. 11, the baffle 600 is positioned closer to the first end 213 of the filler inlet 200 than the second end 215. Further, the baffle 600 may be positioned within the interior of the filler inlet 200 and joined with (e.g., fused or otherwise coupled with) surfaces forming the inner perimeter of the filler inlet 200 such that the baffle 600 is angled relative to the first opening 202 and the second opening 204. For example, the baffle 600 may be a planar wall (e.g., a flat wall, without curvature in at least one direction) extending across a length of the fuel/air separation chamber 611. In the examples shown, the baffle 600 does not include curvature in the direction of axis 210. A first end 608 of the baffle 600 is joined to the inner perimeter of the interior of the filler inlet 200 (e.g., the surfaces forming the fuel/air separation chamber 611), and a second end 610 of the baffle 600 forms an edge 800 (as shown by FIG. 8) that extends across opposing sides of the inner perimeter (e.g., across opposing sides of the fuel/air separation chamber 611). In the examples shown, the edge 800 formed by the second end 610 of the baffle 600 is straight (e.g., without curvature). In other examples, the edge 800 may have a different shape (e.g., a curved shape). Edge 800 extends between opposing sides of the fuel/air separation chamber 611 in a direction perpendicular to the axis 210 (e.g., as indicated by arrow 810 shown by FIG. 8). Further, the edge 800 may be positioned between the flow guide 602 and the second opening 204 in a radial direction 930 of the axis 210, as shown by FIG. 9. Edge 800 may be positioned closer to axis 210 in the radial direction 930 of the axis 210 than axis 212, as illustrated by FIG. 9.

Baffle 600 is positioned within the filler inlet 200 such that during conditions in which the filler inlet 200 is coupled to the vehicle (e.g., as described above), the baffle 600 is positioned vertically higher than the flow guide 602 relative to the surface on which the vehicle sits. Specifically, a first portion of the baffle 600 (e.g., the first end 608) coupled (e.g., joined) to the inner perimeter of the interior of the filler inlet 200 is positioned vertically above the lower end 912 of the protruding portion 217, and a second portion of the baffle 600 (e.g., the edge 800 formed at the second end 610) is positioned vertically below the lower end 912 of the protruding portion 217 and vertically above an end 604 of the flow guide 602.

Baffle 600 may extend across the interior of the filler inlet 200 in an angled direction relative to the first opening 202 and the second opening 204, and a first surface 920 of the baffle 600 (shown by FIG. 9) may be coupled (e.g., joined) to the flow guide 602 to form a sidewall of the protruding portion 217. In this configuration, baffle 600 blocks (e.g., obstructs) fuel from flowing from the fuel nozzle directly into the fuel/air separation chamber 611 in directions that are not tangential to the curved wall 702. For example, fuel may not flow directly from the fuel nozzle in a direction parallel to axis 210. Instead, the baffle 600 and flow guide 602 together guide the fuel from the fuel nozzle toward the end 604 of the flow guide 602 and in the tangential direction of curved wall 702 (e.g., along the curved wall 702).

Further, in this configuration, a backflow chamber 802 is formed between the flow guide 602 and the baffle 600, with the backflow chamber 802 being separated from a portion of the fuel/air separation chamber 611 by the baffle 600. Specifically, the backflow chamber 802 is fluidly coupled to the fuel/air separation chamber 611 and is formed by a lower surface 1000 of the flow guide 602 (e.g., a surface of the flow guide 602 positioned opposite to surface 820 joining the flow guide 602 to the protruding portion 217) and first surface 920 of the baffle 600 (e.g., a surface of the baffle 600 facing toward the first end 213 of the filler inlet 200, with the first surface 920 being opposite to a second surface 720 of the baffle 600 facing toward the second end 215 of the filler inlet 200). The first surface 920 and second surface 720 of the baffle 600 are positioned parallel to each other and are each angled relative to the first opening 202 and second opening 204. Edge 800 may join the first surface 920 to the second surface 720.

During conditions in which fuel flows into the filler inlet 200 via the fuel nozzle as described above, a turbulence of fuel flowing from the fuel nozzle may result in a portion of the fuel flowing against curved wall 702 to be directed away from the curved wall 702. For example, during conditions in which a pressure and/or turbulence of fuel flowing from the fuel nozzle is relatively high and/or unsteady, the fuel flowing from the fuel nozzle may have an increased likelihood of splashing against the surfaces of the interior of the filler inlet 200, resulting in a decreased flow of fuel toward the fuel/air separation chamber 611. In order to reduce a likelihood of accumulation of foam and/or air bubbles and decrease a likelihood of premature fuel nozzle shut-off, the flow guide 602 and baffle 600 are shaped and positioned such that the splashed fuel is directed toward the backflow chamber 802 instead of the fuel nozzle. Fuel directed into the backflow chamber 802 is isolated from the fuel nozzle by the flow guide 602, resulting in a decreased amount of fuel flowing from the curved wall 702 toward the fuel nozzle. The trapped fuel (e.g., the fuel flowing into the backflow chamber 802 instead of toward the fuel nozzle) may then flow out of the backflow chamber 802 and into the fuel/air separation chamber 611, where the liquid fuel is separated from entrained air as described above. An example of fuel flow from the backflow chamber 802 to the fuel/air separation chamber 611 is indicated by flow arrows 1300 shown by FIG. 13.

The backflow chamber 802 further includes an angled wall 980 (as indicated in FIGS. 9-10) configured to direct the fuel flowing into the filler inlet 200 toward the fuel/air separation chamber 611 and to reduce the flow of the fuel into the backflow chamber 802. The angled wall 980 is offset from the axis 210 (as indicated by arrow 982 shown by FIG. 9) and is angled in a direction from the first opening 202 toward the fuel/air separation chamber 611 and curved wall 702 (as indicated by axis 984 shown by FIG. 9). Although the angled wall 980 is described herein as being angled in the direction from the first opening 202 toward the fuel/air separation chamber 611, the angled wall 980 is fluidly separated from the first opening 202 by the flow guide 602. Fuel does not flow directly from the first opening 202 to the angled wall 980. Instead, fuel is directed from the fuel nozzle toward the curved wall 702 and may flow against the angled wall 980 downstream of the flow guide 602.

In some examples, the angled wall 980 may taper and/or curve toward the curved wall 702 and may be joined with the curved wall 702. During conditions in which fuel flows into the filler inlet 200, the angle of the angled wall 980 relative to the curved wall 702 reduces an amount of fuel flowing into the backflow chamber 802 relative to an amount of fuel flowing into the fuel/air separation chamber 611. Specifically, due to the angle of the angled wall 980 relative to the curved wall 702, fuel has an increased tendency to flow in directions away from the angled wall 980 and toward the curved wall 702. As a result, a likelihood of accumulation of foam and/or air bubbles within the backflow chamber 802 may be reduced. Flow guide 602 may additionally decrease the amount of fuel flowing into the backflow chamber 802 relative to the amount of fuel flowing into the fuel/air separation chamber 611. For example, fuel within the backflow chamber 802 may be prevented from flowing back to the first opening 202 and may instead be directed into the fuel/air separation chamber 611 by the flow guide 602 (e.g., due to the position of the flow guide 602 relative to the backflow chamber 802).

Figure 14:
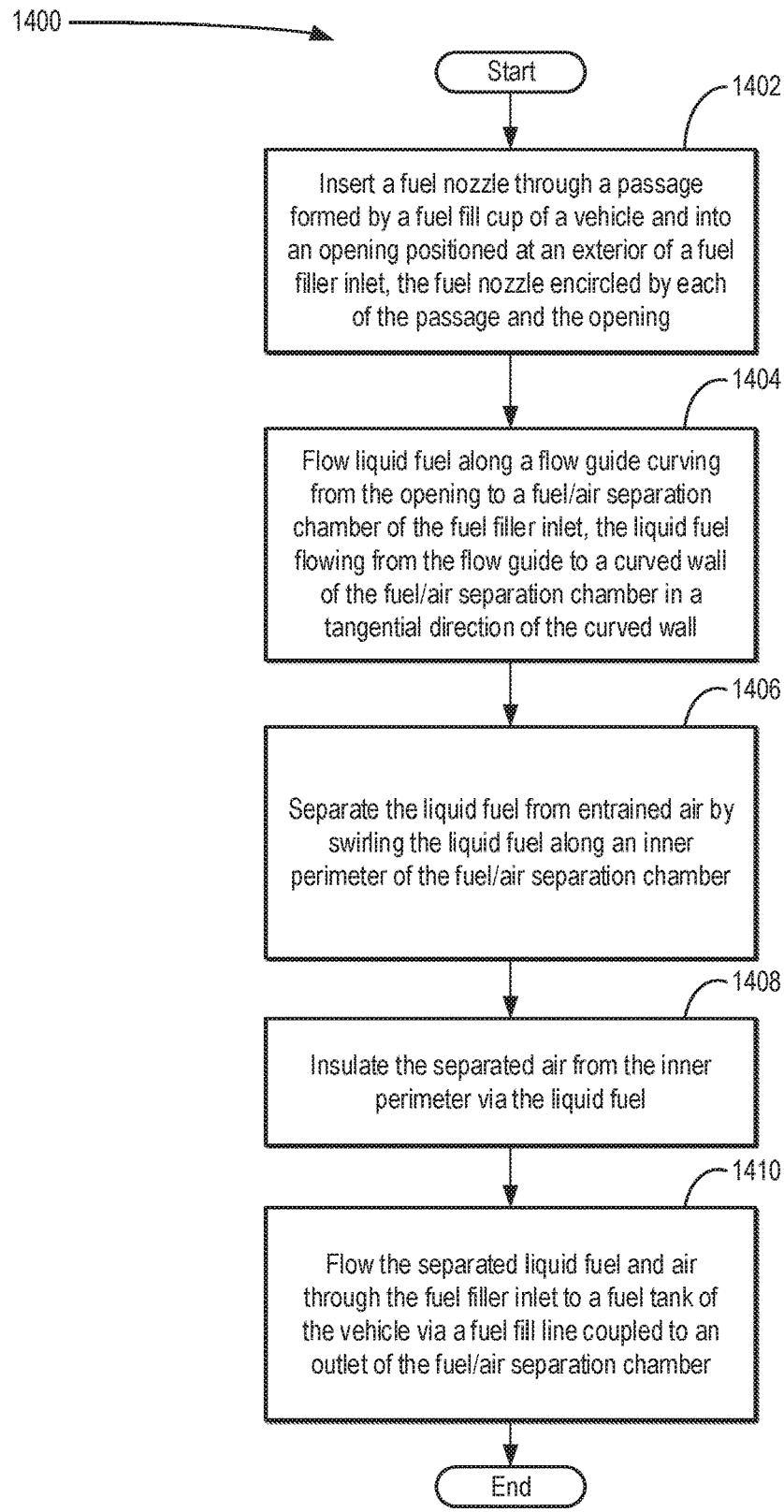
FIG. 14 shows a flowchart illustrating a method for flowing fuel through a filler inlet.

FIG. 14 shows a flowchart illustrating a method 1400 for flowing fuel through a fuel filler inlet, such as the filler inlet 63 described above with reference to FIG. 1 and/or the filler inlet 200 described above with reference to FIGS. 2-13.

At 1402, the method includes inserting a fuel nozzle through a passage formed by a fuel fill cup of a vehicle and into an opening positioned at an exterior of a fuel filler inlet, the fuel nozzle encircled by each of the passage and the opening. For example, the fuel nozzle, passage, fuel fill cup, vehicle, opening, and exterior may be similar to the nozzle 65 shown by FIG. 1, passage 49 shown by FIG. 1 and/or a passage 1202 shown by FIGS. 12-13, fill cup 47 shown by FIG. 1 and/or fill cup 1200 shown by FIGS. 12-13, vehicle system 6 shown by FIG. 1, first opening 202 shown by FIGS. 2-11, and exterior 221 shown by FIGS. 2-13, respectively. The passage of the fuel fill cup may be coupled with a protruding portion of the fuel filler inlet (e.g., protruding portion 69 described above) such that the passage of the fuel fill cup is disposed within the opening of the fuel filler inlet, and inserting the fuel nozzle into the passage enables the fuel nozzle to deliver fuel to an interior of the fuel filler inlet.

The method continues from 1402 to 1404 where the method includes flowing liquid fuel along a flow guide curving from the opening to a fuel/air separation chamber of the fuel filler inlet, the liquid fuel flowing from the flow guide to a curved wall of the fuel/air separation chamber in a tangential direction of the curved wall. For example, the flow guide, fuel/air separation chamber, curved wall, and tangential direction may be similar to the flow guide 602, fuel/air separation chamber 611, curved wall 702, and direction of axis 910, respectively, as described above. The fuel may flow from the nozzle to the fuel guide, and the fuel guide may direct the fuel in the direction of the curved wall such that the fuel flows tangentially along the curved wall (e.g., with the flow curving according to the curvature of the curved wall). As the fuel flows from the nozzle and into the filler inlet, atmospheric air may be entrained with the liquid fuel (by flow of air into the filler inlet via a shut-off sensor of the fuel nozzle, for example, with the shut-off sensor being fluidly coupled to atmosphere). In order to reduce a likelihood of foam and/or air bubbles within the filler inlet, the liquid fuel is separated from the entrained air as described below.

The method continues from 1404 to 1406 where the method includes separating the liquid fuel from entrained air by swirling the liquid fuel along an inner perimeter of the fuel/air separation chamber. For example, as described above, the fuel may flow along surfaces forming the inner perimeter of the fuel/air separation chamber in a helical direction, as shown by arrow 1104 of FIG. 11. An initial velocity of the fuel as the fuel is directed into the fuel/air separation chamber is in the tangential direction of the curved wall as described above, resulting in the helical motion of the fuel along the inner perimeter of the fuel/air separation chamber. As the fuel flows (e.g., swirls) along the inner perimeter, entrained air may be separated from the liquid fuel due to a density of the air being less than a density of the fuel, as described above. The reduced density of the air relative to the liquid fuel increases a likelihood of accumulation of the air within a center of the fuel/air separation chamber due to centripetal acceleration of the liquid fuel along the inner perimeter and around a central axis of the filler inlet (e.g., axis 210 described above). The fuel may be further accelerated by gravity around the inner perimeter and toward an outlet of the filler inlet (e.g., second opening 204) due to a tapering in diameter of the fuel/air separation chamber toward the outlet, with the liquid fuel being forced against the inner perimeter as the entrained air separates from the fuel and accumulates toward the center of the fuel/air separation chamber.

In the examples described herein, swirling the liquid fuel along the inner perimeter occurs downstream of the shut-off sensor of the fuel nozzle while the fuel nozzle is encircled by the passage and the opening and positioned against the flow guide. For example, the liquid fuel may swirl along the inner perimeter downstream of shut-off sensor 1302 of nozzle 1304, as shown by FIG. 13. Swirling the fuel downstream of the shut-off sensor may include not flowing the liquid fuel toward the opening of the filler inlet (e.g., first opening 202) and instead flowing the liquid fuel against a baffle of the fuel filler inlet (e.g., baffle 600) positioned downstream of the flow guide relative to the opening, the baffle and flow guide forming a backflow chamber (e.g., backflow chamber 802) separating the fuel/air separation chamber from the opening. For example, because the shut-off sensor is positioned upstream of the fuel/air separation chamber, and because the fuel/air separation chamber is separated from the opening by the baffle and flow guide, fuel may be prevented from flowing (e.g., splashing) from the fuel/air separation chamber to the shut-off sensor. As a result, a likelihood of premature nozzle shut-off may be reduced.

The method continues from 1406 to 1408 where the method includes insulating the separated air from the inner perimeter via the liquid fuel. For example, as described above, the entrained air may separate from the liquid fuel and accumulate within the center of the fuel/air separation chamber. As the separated air accumulates at the center, the separated air may be prevented from contacting the inner perimeter of the fuel/air separation chamber due to the flow of liquid fuel along the inner perimeter. In one example, the liquid fluid may be in contact with substantially an entire surface area of the inner perimeter of the fuel/air separation chamber (e.g., the surfaces of the interior of the filler inlet forming the fuel/air separation chamber) such that the separated air is surrounded by the liquid fuel. Each portion of the surfaces forming the inner perimeter of the fuel/air separation chamber may be separated from the separated air by the liquid fuel.

The method continues from 1408 to 1410 where the method includes flowing the separated liquid fuel and air through the fuel filler inlet to a fuel tank of the vehicle via a fuel fill line coupled to an outlet of the fuel/air separation chamber. In one example, the fuel tank and fuel fill line may be similar to the fuel tank 20 and fuel fill line 11 described above with reference to FIG. 1. The liquid fuel and separated air may flow out of the fuel filler inlet via the outlet of the filler inlet (e.g., second opening 204) and into the fuel fill line. As described above, in some examples the filler inlet and fuel fill line may be fused together (e.g., welded) or formed together as a single unit.

FIGS. 2-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by flowing fuel into the filler inlet from the fuel nozzle in the direction that is angled relative to the direction of fuel flowing out of the filler inlet, the filler inlet may have a decreased size, and a swirl of the fuel within the filler inlet may be increased. The fuel may be directed by the flow guide into the fuel/air separation chamber in the tangential direction of the curved wall of the fuel/air separation chamber, and the fuel may then flow along the inner perimeter of the fuel/air separation chamber in the helical direction to separate the liquid fuel from entrained air. By separating the liquid fuel from the entrained air, a likelihood of formation of air bubbles and/or foam may be reduced. Additionally, the backflow chamber may reduce an amount of fuel splashing toward the fuel nozzle within the filler inlet, resulting in a decreased likelihood of interference of the fuel with the shut-off sensor of the fuel nozzle and decreasing a likelihood of premature fuel nozzle shut-off.

In one embodiment, an apparatus comprises: a first opening having a normal axis offset from, and neither perpendicular nor parallel to, a central axis of a fuel filler inlet of a vehicle, the first opening adapted to receive a fuel nozzle; a fuel/air separation chamber in the fuel filler inlet including a curved wall; and a flow guide curving into the chamber and positioned to flow fuel from the fuel nozzle tangentially against the curved wall. In a first example of the apparatus, the apparatus further comprises wherein the first opening is adapted to receive a fill cup of the vehicle, the fuel nozzle being encircled by both of the fill cup and the first opening. A second example of the apparatus optionally includes the first example, and further includes wherein the first opening is positioned at a first end of the fuel filler inlet and a second opening is positioned at a second end of the fuel filler inlet, with a normal axis of the second opening being coaxial with the central axis. A third example of the apparatus optionally includes one or both of the first and second examples, and further includes wherein the first opening is positioned at a first end of the fuel filler inlet and a second opening is positioned at a second end of the fuel filler inlet, and where the fuel/air separation chamber tapers from a larger, first diameter to a smaller, second diameter in a direction of the central axis, with the first diameter being greater than diameters of each of the first opening and second opening. A fourth example of the apparatus optionally includes one or more or each of the first through third examples, and further includes wherein the flow guide curves in a direction away from the normal axis of the first opening and around the central axis. A fifth example of the apparatus optionally includes one or more or each of the first through fourth examples, and further includes a baffle positioned downstream of the flow guide in a direction of fuel flow from the fuel nozzle toward the flow guide. A sixth example of the apparatus optionally includes one or more or each of the first through fifth examples, and further includes wherein the baffle is joined to an inner perimeter of the fuel filler inlet and includes a planar, flat edge that extends across opposing sides of the inner perimeter, where the edge is positioned closer to the central axis in a radial direction of the central axis than the normal axis. A seventh example of the apparatus optionally includes one or more or each of the first through sixth examples, and further includes wherein the baffle is joined to the flow guide and the curved wall and forms a sidewall of a passage of the fuel filler inlet, the passage extending from the first opening to the flow guide and adapted to receive the fuel nozzle. An eighth example of the apparatus optionally includes one or more or each of the first through seventh examples, and further includes wherein the baffle is adapted to direct fuel from the fuel nozzle along the flow guide and block fuel from flowing from the fuel nozzle directly into the fuel/air separation chamber in directions that are not tangential to the curved wall. A ninth example of the apparatus optionally includes one or more or each of the first through eighth examples, and further includes wherein the baffle is positioned closer to a first end of the fuel filler inlet than a second end, with the first opening positioned at the first end and a second opening positioned at the second end, where the first and second openings are the only openings at an exterior of the fuel filler inlet. A tenth example of the apparatus optionally includes one or more or each of the first through ninth examples, and further includes wherein the baffle consists of a flat, planar wall angled relative to the first and second openings, where the baffle separates an interior of the fuel filler inlet into the fuel/air separation chamber and a backflow chamber, the backflow chamber including an angled wall angled in a direction from the first opening toward the fuel/air separation chamber, where the flow guide separates the angled wall from the first opening.

In one embodiment, a method comprises: inserting a fuel nozzle through a passage formed by a fuel fill cup of a vehicle and into an opening positioned at an exterior of a fuel filler inlet, the fuel nozzle encircled by each of the passage and the opening; flowing liquid fuel along a flow guide curving from the opening to a fuel/air separation chamber of the fuel filler inlet, the liquid fuel flowing from the flow guide to a curved wall of the fuel/air separation chamber in a tangential direction of the curved wall; and separating the liquid fuel from entrained air by swirling the liquid fuel along an inner perimeter of the fuel/air separation chamber. In a first example of the method, the method further includes wherein swirling the liquid fuel along the inner perimeter occurs downstream of a shut-off sensor of the fuel nozzle while the fuel nozzle is encircled by the passage and the opening and positioned against the flow guide. A second example of the method optionally includes the first example, and further includes, while separating the liquid fuel from the entrained air, not flowing the liquid fuel toward the opening and instead flowing the liquid fuel against a baffle of the fuel filler inlet positioned downstream of the flow guide relative to the opening, the baffle and flow guide forming a backflow chamber separating the fuel/air separation chamber from the opening, the backflow chamber including an angled wall adapted to flow fuel from the backflow chamber toward the fuel/air separation chamber. A third example of the method optionally includes one or both of the first and second examples, and further includes accelerating the swirl of the liquid fuel along the inner perimeter of the fuel/air separation chamber toward an outlet of the fuel filler inlet via gravity, the fuel/air separation chamber tapering in diameter toward the outlet. A fourth example of the method optionally includes one or more or each of the first through third examples, and further includes wherein, after separating the liquid fuel from the entrained air, insulating the separated air from the inner perimeter via the liquid fuel as the separated air flows through the fuel/air separation chamber. A fifth example of the method optionally includes one or more or each of the first through fourth examples, and further includes flowing the separated liquid fuel and air through the fuel filler inlet to a fuel tank of the vehicle via a fuel fill line coupled to an outlet of the fuel/air separation chamber.

In one embodiment, a system comprises: a fuel tank adapted to store a liquid fuel; a fuel fill line including a first end and an opposing, second end, the first end coupled to the fuel tank; a fuel filler inlet including: a first port coupled to the second end of the fuel fill line, the first port and second end each having a same, first diameter; a second port adapted to receive a fuel dispenser, the second port having a second diameter; a conical fuel/air separation chamber forming an interior of the fuel filler inlet, the chamber positioned between the first port and second port and fluidly coupling the first port to the second port, the chamber tapering from a third diameter to the first diameter in a direction from the second port to the first port; and a flow guide curving from the second port into the chamber, the flow guide positioned to flow fuel from the fuel dispenser in a tangential direction of an inner perimeter of the chamber. In a first example of the system, the system further comprises a baffle having first and second surfaces parallel to each other and angled relative to the first and second ports, the first and second surfaces joined to the inner perimeter and forming an edge extending between opposing sides of the chamber in a direction perpendicular to a central axis of the fuel filler inlet, the edge positioned between the flow guide and the second port in a radial direction of the central axis. A second example of the system optionally includes the first example, and further includes wherein the first surface of the baffle is joined to the fuel guide, with the fuel guide and the first surface of the baffle forming each of a passage and a backflow chamber, the passage including the second port, the backflow chamber including an angled wall offset from the central axis and angled in a direction from the second port to the fuel/air separation chamber.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
inserting a fuel nozzle through a passage formed by a fuel fill cup of a vehicle and into an opening positioned at an exterior of a fuel filler inlet, the fuel nozzle encircled by each of the passage and the opening;
flowing liquid fuel along a flow guide curving from the opening to a fuel/air separation chamber of the fuel filler inlet, the liquid fuel flowing from the flow guide to a curved wall of the fuel/air separation chamber in a tangential direction of the curved wall; and
separating the liquid fuel from entrained air by swirling the liquid fuel along an inner perimeter of the fuel/air separation chamber.

2. The method of claim 1, wherein swirling the liquid fuel along the inner perimeter occurs downstream of a shut-off sensor of the fuel nozzle while the fuel nozzle is encircled by the passage and the opening and positioned against the flow guide.

3. The method of claim 1, further comprising, while separating the liquid fuel from the entrained air, not flowing the liquid fuel toward the opening and instead flowing the liquid fuel against a baffle of the fuel filler inlet positioned downstream of the flow guide relative to the opening, the baffle and flow guide forming a backflow chamber separating the fuel/air separation chamber from the opening, the backflow chamber including an angled wall adapted to flow fuel from the backflow chamber toward the fuel/air separation chamber.

4. The method of claim 1, further comprising accelerating the swirling liquid fuel from the fuel/air separation chamber toward an outlet of the fuel filler inlet via gravity, the outlet positioned vertically below the fuel/air separation chamber relative to a ground surface on which the vehicle sits, and the fuel/air separation chamber tapering in diameter toward the outlet.

5. The method of claim 1, wherein, after separating the liquid fuel from the entrained air, insulating the separated air from the inner perimeter via the liquid fuel as the separated air flows through the fuel/air separation chamber.

6. The method of claim 5, further comprising flowing the separated liquid fuel and air through the fuel filler inlet to a fuel tank of the vehicle via a fuel fill line coupled to an outlet of the fuel/air separation chamber.

\* \* \* \* \*